US012625563B2

(12) United States Patent
Nagano et al.

(10) Patent No.: US 12,625,563 B2
(45) Date of Patent: *May 12, 2026

(54) INFORMATION PROCESSING APPARATUS, INFORMATION PROCESSING METHOD, AND PROGRAM

(71) Applicant: Sony Group Corporation, Tokyo (JP)

(72) Inventors: Keijiroh Nagano, Tokyo (JP); Tsuyoshi Ishikawa, Kanagawa (JP); Shin Shiroma, Tokyo (JP); Daisuke Tajima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/063,989

(22) Filed: Feb. 26, 2025

(65) Prior Publication Data

US 2025/0216953 A1     Jul. 3, 2025

Related U.S. Application Data

(63) Continuation of application No. 18/571,510, filed as application No. PCT/JP2022/010069 on Mar. 8, 2022, now Pat. No. 12,260,025.

(30) Foreign Application Priority Data

Jul. 8, 2021     (JP) ................................. 2021-113612

(51) Int. Cl.
G06F 3/01           (2006.01)
(52) U.S. Cl.
CPC .............. G06F 3/017 (2013.01); G06F 3/011 (2013.01)

(58) Field of Classification Search
CPC ................................. G06F 3/017; G06F 3/011
See application file for complete search history.

(56) References Cited

U.S. PATENT DOCUMENTS

| | | |
|---|---|---|
| 5,335,557 A | 8/1994 | Yasutake |
| 5,483,261 A | 1/1996 | Yasutake |
| 6,597,347 B1 | 7/2003 | Yasutake |
| 7,731,387 B2 | 6/2010 | Cortenraad et al. |
| 10,222,889 B2 | 3/2019 | Picciotto et al. |
| 11,016,626 B2 | 5/2021 | Matsuda et al. |
| 11,068,118 B2 | 7/2021 | Rosenberg et al. |
| 11,137,830 B1 | 10/2021 | Jackson et al. |

(Continued)

FOREIGN PATENT DOCUMENTS

| | | |
|---|---|---|
| JP | H06203132 A | 7/1994 |
| JP | 2018-032217 A | 3/2018 |

(Continued)

*Primary Examiner* — Dmitriy Bolotin
(74) *Attorney, Agent, or Firm* — Paratus Law Group, PLLC

(57)          ABSTRACT

An information processing apparatus according to an embodiment of the present technology includes a hold determination unit. The hold determination unit determines, in a case where a rate of decrease of a distance between a first hold-side object and a second hold-side object that set a virtual object as a pinch-and-hold target becomes smaller than a predetermined threshold value, that the virtual object has been held by the first hold-side object and the second hold-side object. Accordingly, a high-quality virtual experience can be achieved.

20 Claims, 13 Drawing Sheets

(56)     References Cited

U.S. PATENT DOCUMENTS

| | | | |
|---|---|---|---|
| 11,334,239 | B2 | 5/2022 | Yoon et al. |
| 11,449,224 | B2 | 9/2022 | Westerman |
| 12,260,025 | B2 * | 3/2025 | Nagano ................. A63F 13/212 |
| 2005/0124401 | A1 | 6/2005 | Izuno et al. |
| 2006/0197750 | A1 | 9/2006 | Kerr et al. |
| 2009/0184936 | A1 | 7/2009 | Algreatly |
| 2011/0227871 | A1 | 9/2011 | Cannon |
| 2011/0260998 | A1 | 10/2011 | Ludwig |
| 2014/0157206 | A1 * | 6/2014 | Ovsiannikov ....... G06F 3/04845 |
| | | | 715/849 |
| 2016/0109947 | A1 | 4/2016 | George-Svahn et al. |
| 2016/0110078 | A1 | 4/2016 | Kudo et al. |
| 2016/0216761 | A1 | 7/2016 | Klingström et al. |
| 2020/0218349 | A1 | 7/2020 | Chu et al. |
| 2023/0186431 | A1 | 6/2023 | Chen et al. |

FOREIGN PATENT DOCUMENTS

| | | | |
|---|---|---|---|
| JP | 2020-046981 | A | 3/2020 |
| WO | WO 2017/204120 | A1 | 11/2017 |
| WO | WO 2019/082853 | A1 | 5/2019 |
| WO | WO 2019/082854 | A1 | 5/2019 |

* cited by examiner

A

B

A

B

C

A

B

INFORMATION PROCESSING APPARATUS, INFORMATION PROCESSING METHOD, AND PROGRAM

CROSS REFERENCE TO PRIOR APPLICATION

This application is a continuation of U.S. patent application Ser. No. 18/571,510 (filed on Dec. 18, 2023), which is a National Stage Patent Application of PCT International Patent Application No. PCT/JP2022/010069 (filed on Mar. 8, 2022) under 35 U.S.C. § 371, which claims priority to Japanese Patent Application No. 2021-113612 (filed on Jul. 8, 2021), which are all hereby incorporated by reference in their entirety.

TECHNICAL FIELD

The present technology relates to an information processing apparatus, an information processing method, and a program that can be applied to creation of a virtual space such as a virtual reality (VR) space and an augmented reality (AR) space.

BACKGROUND ART

Patent Literature 1 has disclosed a technology that enables a user to make an intuitive operation on an object in a virtual reality space and enables reduction of a necessary amount of calculation for achieving such an operation.

CITATION LIST

Patent Literature

Patent Literature 1: WO 2017/204120

DISCLOSURE OF INVENTION

Technical Problem

It is thus desirable to provide a technology capable of achieving a high-quality virtual experience.

In view of the above-mentioned circumstances, it is an objective of the present technology to provide an information processing apparatus, an information processing method, and a program that are capable of achieving a high-quality virtual experience.

Solution to Problem

In order to accomplish the above-mentioned objective, an information processing apparatus according to an embodiment of the present technology includes a hold determination unit.

The hold determination unit determines, in a case where a rate of decrease of a distance between a first hold-side object and a second hold-side object that set a virtual object as a pinch-and-hold target becomes smaller than a predetermined threshold value, that the virtual object has been held by the first hold-side object and the second hold-side object.

In this information processing apparatus, it is determined that the virtual object has been held in a case where the rate of decrease of the distance between the first hold-side object and the second hold-side object becomes smaller than the predetermined threshold value. Accordingly, a high-quality virtual experience can be achieved.

The information processing apparatus may further include a storage unit and a cancel determination unit.

The storage unit stores a distance between the first hold-side object and the second hold-side object when the hold determination unit determines that the virtual object has been held, as a hold determination distance.

The cancel determination unit determines whether or not the hold of the virtual object by the first hold-side object and the second hold-side object has been cancelled on the basis of the stored hold determination distance.

The cancel determination unit may determine that the hold has been cancelled in a case where the distance between the first hold-side object and the second hold-side object becomes larger than a distance obtained by adding a predetermined threshold value to the hold determination distance.

The first hold-side object may be one or more predetermined fingers of a user. In this case, the second hold-side object is one or more other fingers different from the one or more predetermined fingers of the user.

The hold determination unit may set two objects which attempt to pinch and hold the virtual object as the first hold-side object and the second hold-side object.

The hold determination unit may set, in a case where a user has directed a finger pad of each of two fingers towards the virtual object, the two fingers as the first hold-side object and the second hold-side object, respectively.

The hold determination unit may set, in a case where a user has directed portions of two adjacent fingers, which face each other, towards the virtual object, the two fingers as the first hold-side object and the second hold-side object, respectively.

The hold determination unit may set two objects whose distance to the virtual object is smaller than the predetermined threshold value as the first hold-side object and the second hold-side object, respectively.

The hold determination unit may set two objects determined to have collided with the virtual object as the first hold-side object and the second hold-side object, respectively.

The hold determination unit may set the first hold-side object and the second hold-side object on the basis of at least one of a shape or a size of the virtual object.

The hold determination unit may set a thumb finger of a user and one or more other fingers of the same hand as the thumb finger as the first hold-side object and the second hold-side object.

The hold determination unit executes, in a case where a plurality of fingers is set as the first hold-side object or the second hold-side object, hold determination of the virtual object by using a position of a center of weight of the plurality of fingers as a reference.

The information processing apparatus may further include a notification control unit that notifies a user of at least one of the fact that the virtual object has been held by the first hold-side object and the second hold-side object or the fact that the hold of the virtual object by the first hold-side object and the second hold-side object has been cancelled.

The notification control unit may execute notification by at least one of presentation of a sense of touch, display of a virtual image, or output of a sound.

The notification control unit may display, in a case where the first hold-side object or the second hold-side object which holds the virtual object is spaced apart from the virtual object when the hold determination unit determines that the virtual object has been held, a virtual image of the hold-side object spaced apart from the virtual object in such a manner that the virtual image is in contact with the virtual object.

The information processing apparatus may further include a storage unit that stores a distance between the first hold-side object and the second hold-side object when the hold determination unit determines that the virtual object has been held, as a hold determination distance. In this case, the hold determination unit may determine, in a case where the distance between the first hold-side object and the second hold-side object becomes equal to the hold determination distance stored at the time when the same virtual object is pinched and held in the past, that the virtual object has been held by the first hold-side object and the second hold-side object.

The information processing apparatus may further include a storage unit that stores, with respect to each of a plurality of users, a distance between the first hold-side object and the second hold-side object when the hold determination unit determines that the virtual object has been held, as a hold determination distance. In this case, the hold determination unit may determine, in a case where the distance between the first hold-side object and the second hold-side object becomes equal to the hold determination distance stored at the time when another user pinches and holds the same virtual object, that the virtual object has been held by the first hold-side object and the second hold-side object.

The information processing apparatus may further include a storage unit that stores a distance between the first hold-side object and the second hold-side object when an actual object corresponding to the virtual object has been pinched and held by the first hold-side object and the second hold-side object as an actual hold distance. In this case, the hold determination unit may determine, in a case where the distance between the first hold-side object and the second hold-side object becomes equal to the actual hold distance, that the virtual object has been held by the first hold-side object and the second hold-side object.

An information processing method according to an embodiment of the present technology is an information processing method to be executed by a computer system and includes determining, in a case where a rate of decrease of a distance between a first hold-side object and a second hold-side object that set a virtual object as a pinch-and-hold target becomes smaller than a predetermined threshold value, that the virtual object has been held by the first hold-side object and the second hold-side object.

A program according to an embodiment of the present technology causes a computer system to execute the following step.

A step of determining, in a case where a rate of decrease of a distance between a first hold-side object and a second hold-side object that set a virtual object as a pinch-and-hold target becomes smaller than a predetermined threshold value, that the virtual object has been held by the first hold-side object and the second hold-side object.

MODE(S) FOR CARRYING OUT THE INVENTION

Hereinafter, embodiments according to the present technology will be described with reference to the drawings.

[AR Providing System]

Figure 1:
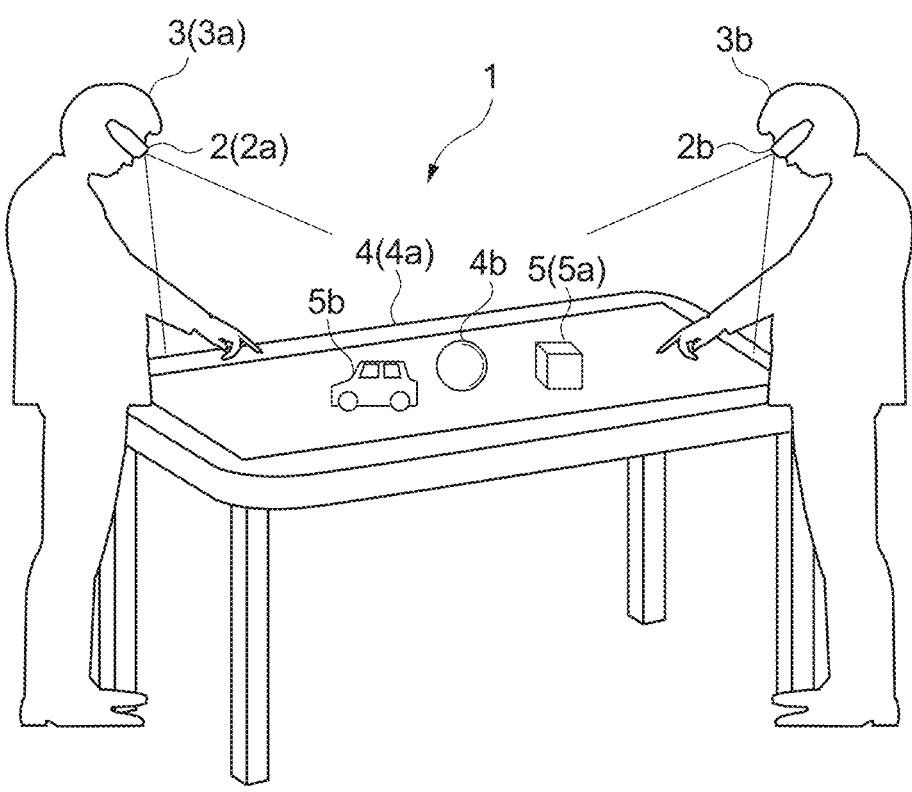
FIG. 1 A schematic view for outlining an AR providing system according to an embodiment.

FIG. 1 is a schematic view for outlining an AR providing system according to an embodiment of the present technology. An AR providing system 1 corresponds to an embodiment of an information processing system according to the present technology.

The AR providing system 1 includes a head-mounted display (HMD) 2.

As shown in FIG. 1, the HMD 2 is put on the head of a user 3 for use.

The HMD 2 is an eyeglasses-type device with a see-through display. The HMD 2 is also called AR glasses.

In the present embodiment, the HMD 2 reproduces virtual content to the user 3. This can provide an AR space (virtual space) to the user 3 using the HMD 2. The user 3 can experience various AR worlds by using the HMD 2.

The reproduction of the virtual content includes displaying the virtual object to be superimposed on the real world. Moreover, the reproduction of the virtual content includes outputting virtual sounds. In addition, a smell, a sense of touch, and the like may be virtually provided to the user 3.

In the example shown in FIG. 1, two users 3a and 3b respectively wear HMDs 2a and 2b and use this AR providing system 1.

Specifically, a table 4a is placed as an actual object 4 in the real world. Moreover, a ball 4b is placed on the table 4a as an actual object.

Using positions of these actual objects 4 as references, a cubic box 5a and a model car 5b are placed as virtual objects 5. The model car 5b travels between the ball 4b as the actual object 4 and the box 5a as the virtual object 5.

The users 3a and 3b can grasp and move the box 5a as the virtual object 5 with their hands. A traveling route of the model car 5b changes in accordance with a change in position of the box 5a, and the users can enjoy its state.

The model car 5b and the box 5a are objects displayed by the HMD 2 as virtual images, and those are not actually placed on the table 4a.

On the other hand, the users 3a and 3b perceive as if the model car 5b and the box 5a were placed on the table 4a as shown in FIG. 1.

Using this AR providing system 1 enables such an AR experience. As a matter of course, the AR world that can be experienced by applying the present technology is not limited, and a variety of AR worlds can be experienced.

For example, any virtual image such as computer graphics (CG) of a character and the like, a photograph, and letters can be displayed as the virtual object 5.

Moreover, any sound such as a character's voice, a siren sound, and a door close sound effect can be output as the virtual sound.

Moreover, the number of users 3 who can experience the virtual space is also not limited.

In the present embodiment, the HMD 2 functions as an embodiment of an information processing apparatus according to the present technology.

[HMD]

Figure 2:
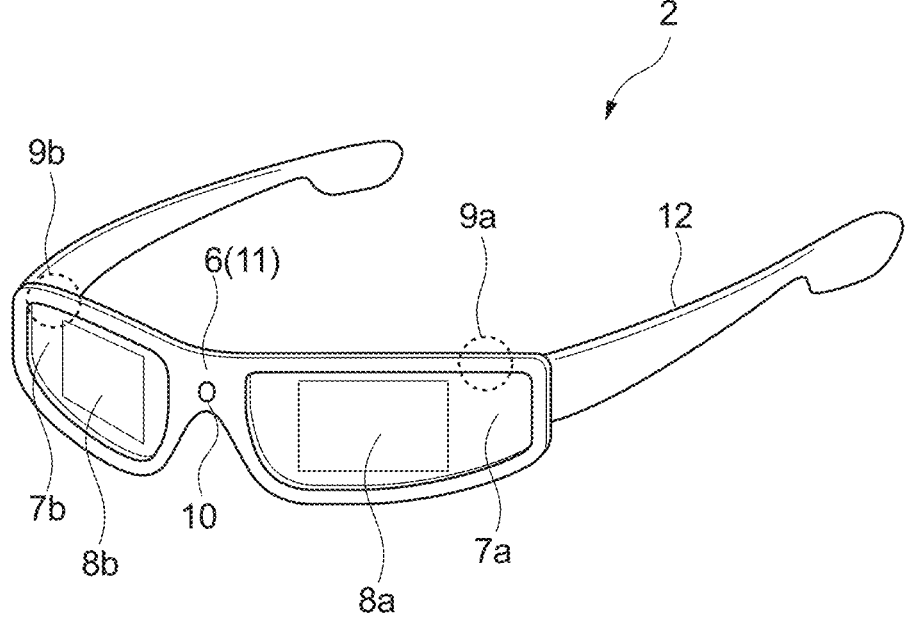
FIG. 2 A perspective view showing an outer appearance example of an HMD.

FIG. 2 is a perspective view showing an outer appearance example of the HMD 2.

The HMD 2 has a frame 6, a left eye lens 7a and a right eye lens 7b, a left eye display 8a and a right eye display 8b, a left eye camera 9a and a right eye camera 9b, and an outside camera 10.

The frame 6 has an eyeglasses-like shape and has a rim portion 11 and temples 12.

The rim portion 11 is a portion arranged in front of the left and right eyes of the user 3 and respectively supports the left eye lens 7a and the right eye lens 7b.

The temples 12 extend rearward to both ears of the user 3 from both ends of the rim portion 11. End portions of the temples 12 are attached to the both ears. The rim portion 11 and the temples 12 are made of a material, for example, the synthetic resin or metal.

The left eye lens 7a and the right eye lens 7b are respectively arranged in front of the left and right eyes of the user 3, covering at least a part of the field of view of the user 3.

Typically, the respective lenses are designed to correct the eyesight of the user 3. As a matter of course, the present technology is not limited thereto, and so-called non-prescription lenses may be used.

The left eye display 8a and the right eye display 8b are see-through displays. The left eye display 8a and the right eye display 8b are respectively arranged to cover a partial region of the left and right eye lenses 7a and 7b. That is, the left and right eye displays 8a and 8b are respectively arranged in front of the left and right eyes of the user 3.

The left and right eye displays 8a and 8b respectively display left and right eye images or the like. The user 3 wearing the HMD 2 can visually recognize a real scene and images displayed on the respective displays 8a and 8b at the same time.

Accordingly, the user 3 can experience augmented reality (AR) or the like.

Each of the displays 8a and 8b displays, for example, the virtual object 5.

Examples of the left and right eye displays 8a and 8b include a see-through organic EL display and a liquid-crystal display (LCD).

In addition, specific configurations of the left and right eye displays 8a and 8b are not limited. A see-through display using any method, e.g., a display method of projecting an image on a transparent screen or a display method of displaying an image through a prism or the like may be used as appropriate.

The left eye camera 9a and the right eye camera 9b are provided in the frame 6 as appropriate so as to be capable of imaging the left and right eyes of the user 3. The left eye camera 9a and the right eye camera 9b are capable of detecting gaze information about the gaze of the user 3 or the like, for example, on the basis of left and right eye images captured by the left and right eye cameras 9a and 9b.

Examples of the left and right eye cameras 9a and 9b include a digital camera provided with an image sensor such as a complementary metal-oxide semiconductor (CMOS) sensor and a charge coupled device (CCD) sensor. Moreover, for example, an infrared camera with infrared light such as an infrared LED may be used.

Hereinafter, the left eye lens 7a and the right eye lens 7b will be sometimes both referred to as lenses 7 and the left eye display 8a and the right eye display 8b will be sometimes both referred to as see-through displays 8. Moreover, the left eye camera 9a and the right eye camera 9b will be sometimes both referred to as inside cameras 9. In the present embodiment, the see-through display 8 corresponds to a display unit.

The outside camera 10 is arranged in the middle of the frame 6 (rim portion 11), oriented outward (opposite to the user 3). The outside camera 10 is capable of imaging a real space included in the field of view of the user 3. Therefore, the outside camera 10 is capable of generating a captured image of the real space.

In the present embodiment, the outside camera 10 images an area, which is an area on the front side as viewed from the user 3 and includes a display region of the see-through display 8. That is, the outside camera 10 images the real space to include an area that the user 3 can see through the display region. Examples of the outside camera 10 include a digital camera with an image sensor such as a CMOS sensor and a CCD sensor.

It should be noted that the area that the user 3 can see through the display region is an area where the virtual object 5 can be superimposed on the real world. In the present disclosure, the area will be referred to as an effective field of view of the user 3. The effective field of view can also be said to be an angle of view where the virtual object 5 can be displayed.

Figure 3:
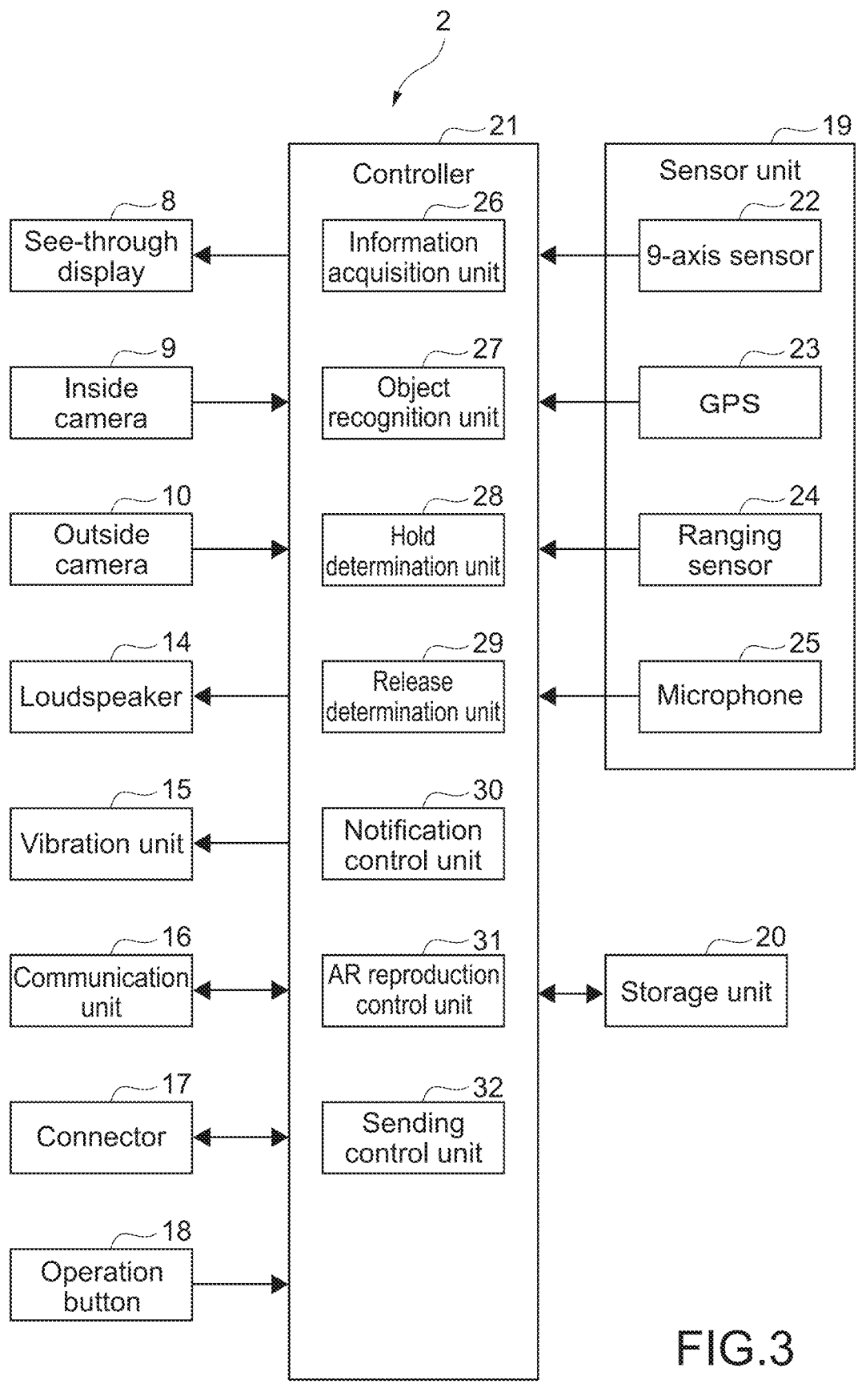
FIG. 3 A block diagram showing a functional configuration example of the HMD.

FIG. 3 is a block diagram showing a functional configuration example of the HMD 2.

As shown in FIG. 3, the HMD 2 further includes a loudspeaker 14, a vibration unit 15, a communication unit 16, a connector 17, an operation button 18, a sensor unit 19, a storage unit 20, and a controller 21.

The loudspeaker 14 is provided at a predetermined position in the frame 6. The configuration of the loudspeaker 14 is not limited. For example, the loudspeaker 14 capable of outputting stereo sound, monaural sound, or the like may be used as appropriate.

The vibration unit 15 is provided inside the frame 6 and generates a vibration. The vibration unit 15 is any vibration motor capable of generating a notifying vibration, for example. By driving the vibration unit 15, a sense of touch can be presented to the user 3.

The vibration unit 15 functions as an embodiment of a tactile presentation unit.

The communication unit 16 is a module for network communication or near-field communication with the other device. A communication module, e.g., a wireless LAN module such as WiFi or Bluetooth (registered trademark) is provided.

The connector 17 is a terminal for connection with the other device. A terminal, e.g., a universal serial bus (USB) or high-definition multimedia interface (HDMI) (registered trademark) is provided. Moreover, a charging terminal of a charging stand (cradle) is connected to the connector 17 for charging.

The operation button 18 is provided at a predetermined position in the frame 6, for example. The operation button 18 enables power-on/off operations and operations related to various functions of the HMD 2, such as image display and audio output-related functions and a network communication function.

The sensor unit 19 includes a 9-axis sensor 22, a GPS 23, a ranging sensor 24, and a microphone 25.

The 9-axis sensor 22 includes a 3-axis acceleration sensor, a 3-axis gyro sensor, and a 3-axis compass sensor. The 9-axis sensor 22 is capable of detecting accelerations, angular velocities, and directions of the HMD 2 in three axes. In addition, an inertial measurement unit (IMU) sensor having any configuration may be used.

The GPS 23 acquires information about a current position of the HMD 2. Detection results of the 9-axis sensor 22 and the GPS 23 are used for detecting attitude and position of the user 3 (HMD 2) and a movement (motion) of the user 3, for example. These sensors are provided at, for example, predetermined positions in the frame 6.

The ranging sensor 24 is capable of acquiring three-dimensional information (distance to a detection target). Examples of the ranging sensor 24 include light detection and ranging, laser imaging detection and ranging (LiDAR), a laser ranging sensor, a stereo camera, a time of flight (ToF) sensor, an ultrasonic sensor, and a structured-light ranging sensor. Alternatively, a sensor having both functions of image sensor and ranging sensor may be used.

The ranging sensor 24 is mounted, for example, using the front side of the user 3 as a detection direction. That is, the ranging sensor 24 is mounted to be capable of measuring a distance in the real space included in the field of view of the user 3. The present technology is not limited thereto, and the ranging sensor 24 may be mounted to be capable of measuring a distance in a 360-degree entire periphery around the user 3 set as a center.

The microphone 25 detects information about a sound in the periphery of the user 3. The microphone 25 detects, for example, a speech uttered by the user 3 as appropriate. This enables the user 3 to, for example, enjoy an AR experience during phone call or input an operation on the HMD 2 by voice input.

The type of sensor provided as the sensor unit 19 is not limited. Any sensor may be provided. For example, a thermal sensor and a humidity sensor capable of measuring temperature and humidity of an environment where the HMD 2 is used may be provided. Moreover, a biometric sensor capable of detecting biometric information of the user 3 may be provided. Examples of the biometric sensor include an electroencephalography sensor, an electromyography sensor, a pulse sensor, a sweat sensor, a thermal sensor, a blood flow sensor, and a body movement sensor.

The inside camera 9 and the outside camera 10 can also be considered as a part of the sensor unit 19.

The storage unit 20 is a storage device such as a non-volatile memory. Examples of the storage unit 20 include a hard disk drive (HDD) and a solid state drive (SSD). In addition, any computer-readable non-transitory storage medium may be used.

The storage unit 20 stores a control program for comprehensively controlling operations of the HMD 2.

Moreover, the storage unit 20 stores various types of information about an AR application for providing the AR space. The storage unit 20 stores, for example, various types of information and data according to the present technology, e.g., content data such as the virtual object and the virtual sound.

Moreover, the storage unit 20 stores a hold determination distance, a release determination distance, and the like to be described later.

A method for installing the control program, the content data, and the like to the HMD 2 is not limited.

For example, the AR application according to the present technology may be provided as a cloud service. In this case, the HMD 2 installs an application program for configuring the AR space from a content provider server in a network. As a matter of course, the present technology is not limited to such an aspect.

The controller 21 controls the operation of each block of the HMD 2. The controller 21 has hardware circuits necessary for a computer, e.g., a CPU and memories (RAM, ROM). The CPU executes a program according to the present technology stored in the storage unit 20 or the memory, thereby executing various types of processing.

Examples of the controller 21 include a programmable logic device (PLD) such as a field programmable gate array (FPGA) and another device such as an application specific integrated circuit (ASIC).

In the present embodiment, the CPU of the controller 21 executes the program according to the present technology (e.g., an application program), thereby achieving, as functional blocks, an information acquisition unit 26, an object recognition unit 27, a hold determination unit 28, a release determination unit 29, a notification control unit 30, an AR reproduction control unit 31, and a sending control unit 32.

Then, these functional blocks execute an information processing method according to the present embodiment. It should be noted that dedicated hardware such as an integrated circuit (IC) may be used as appropriate for achieving each functional block.

The information acquisition unit 26 is capable of, for example, acquiring various types of information from each unit of the HMD 2 and outputting them to each functional block of the controller 21.

The information acquisition unit 26 is capable of, for example, acquiring image information captured by the inside camera 9 and the outside camera 10, detection results (sensor information) of the respective sensors of the sensor unit 19, and the like.

Moreover, the information acquisition unit 26 is also capable of acquiring various types of information received from the other device via the communication unit 16.

The information acquisition unit is also capable of receiving various types of information about the AR application that the user 3 experiences from a predetermined server in the network, for example.

Moreover, the information acquisition unit may be capable of acquiring, for example, images from cameras provided in walls, poles, etc. in the real world for which the AR world has been created and sensor information of ranging sensors, etc.

The object recognition unit 27 is capable of executing recognition processing on image information captured by the inside camera 9 and the outside camera 10 and detection results from the respective sensors of the sensor unit 19, thereby recognizing the actual object 4 and outputting a recognition result (recognition information).

The recognition result by the object recognition unit 27 includes any information, e.g., a position of the actual object 4, a state of the actual object 4, and a motion of the actual object 4. The object recognition unit 27 is capable of outputting various types of information, e.g., an amount of movement of the actual object 4, a distance of the actual object 4 from a predetermined position, an attitude of the actual object 4, or the presence/absence of an input operation by the actual object 4 as the recognition result.

A region (actual object region) determined to include the actual object 4 is extracted from, for example, two-dimensional image data, three-dimensional depth image data, or point cloud data as the recognition processing. A predetermined recognition algorithm is executed by inputting data about the extracted actual object region and a recognition result is output.

The present technology is not limited to such processing. A recognition algorithm may be executed by inputting full two-dimensional image data, three-dimensional depth image data, or the like and a recognition result related to the actual object 4 may be output.

For example, recognition processing using a rule-based algorithm is executed as the recognition processing. For example, with respect to the actual object data, recognition information can be generated by, for example, processing of executing matching processing or the like with a model image of the actual object and processing of determining a position of the actual object region on the data with a marker image or the like. Alternatively, the recognition information may be generated by referring to table information from the actual object region data. In addition, any recognition processing using a rule-based algorithm may be employed.

Moreover, recognition processing using a machine learning algorithm may be executed as the recognition processing. Any machine learning algorithm using, for example, a deep neural network (DNN) can be used.

Various types of estimation information can be generated by, for example, inputting actual object region data and executing a machine learning algorithm, and those can be output as a recognition result. For example, the use of artificial intelligence (AI) for deep learning can improve the object recognition estimation accuracy.

For example, a label for recognition information wished to be acquired is set to actual object region data for learning, and data set for learning is generated. A program with learned parameters is generated as a learned model by learning based on a machine learning algorithm with the data set for learning. The learned model is used for outputting a recognition result in response to the input of the actual object region data.

For example, a three-dimensional position of each feature point in the actual object may be determined by inputting three-dimensional information of the actual object region. Moreover, pose estimation may be executed with a machine learning algorithm in a case where the actual object is an entire body or a body part. It should be noted that the pose estimation is also called bone estimation or skeleton estimation.

In addition, any algorithm may be used for the recognition processing.

It should be noted that a machine learning algorithm may be applied to any processing in the present disclosure.

In the present embodiment, the object recognition unit 27 defines a coordinate system with respect to a space in the effective field of view on which the virtual object 5 can be superimposed.

For example, a coordinate value (e.g., XYZ coordinate value) defined by an absolute coordinate system (world coordinate system) may be used. Alternatively, a coordinate value (e.g., xyz coordinate value or uvd coordinate value) defined by a relative coordinate system using a predetermined point as a basis (point of origin) may be used. In a case of using the relative coordinate system, any point of origin may be set as the basis.

For example, a relative coordinate system is defined having world coordinates or the like of a predetermined portion of the table 4*a* as the actual object 4 shown in FIG. 1 as its origin. Information about position, orientation, and the like of the actual object 4 located within the effective field-of-view is acquired by using the defined coordinate system as appropriate. As a matter of course, any other method may be used as a method of defining the position information.

The object recognition unit 27 may estimate a self-position of the user 3 (HMD 2).

For example, the self-position includes position and attitude of the HMD 2. For example, the self-position estimation can calculate a position of the HMD 2 and attitude information regarding which direction the HMD 2 faces.

The self-position of the HMD 2 is calculated on the basis of, for example, detection results from the sensor unit 19 and images captured by the inside camera 9 and the outside camera 10.

For example, position coordinates in a three-dimensional coordinate system (XYZ coordinate system) defined by the object recognition unit 27 are calculated as the self-position of the HMD 2. Moreover, a pitch angle, a roll angle, and a yaw angle about a predetermined reference axis extending on the front side of the user 3 (HMD 2) in a case where the X-axis is set as a pitch axis, the Y-axis is set as a roll axis, and the Z-axis is set as a yaw axis are calculated.

As a matter of course, specific forms and the like of the position information and the attitude information of the user 3 (HMD 2) are not limited.

An algorithm for estimating the self-position of the HMD 2 is not also limited. Any algorithm such as simultaneous localization and mapping (SLAM) may be used. In addition, any machine learning algorithm and the like may be used.

Three-dimensional coordinates of the periphery may be defined on the basis of the estimated self-position of the user 3 (HMD 2).

Moreover, a self-position estimation unit may be configured as a functional block different from the object recognition unit 27.

In the present embodiment, the object recognition unit 27 executes the recognition processing by setting the hands of the users 3*a* and 3*b* as targets. Then, the object recognition unit 27 acquires various types of information related to the hands. It should be noted that the hands include fingers.

The object recognition unit 27 is capable of acquiring, as the recognition result, for example, positions of the right hand and the left hand (including a position relationship between them), attitudes of the right hand and the left hand (including orientations of the hands), motions of the right hand and the left hand (including movement velocity), the presence/absence of an input operation with the right hand and the left hand, and the like.

Moreover, the object recognition unit 27 is capable of acquiring various types of information related to the fingers of each of the right hand and the left hand.

The object recognition unit 27 is capable of acquiring various types of information such as positions (including a position relationship between them), attitudes (including orientations of the fingers), and motions (including movement velocity), for example, with respect to each of the thumb finger, the index finger, the middle finger, the ring finger, and the little finger.

For example, the object recognition unit 27 is capable of determining any input operation such as a touch operation, a drag operation, a scroll operation, and a pinch operation.

Moreover, the object recognition unit 27 is capable of determining a gesture such as "rock" (a state in which the hand is closed), "scissors" (a state in which only the index finger and the middle finger are extended), "paper" (a state in which the hand is opened), and "pistol" (a state in which only the index finger and the thumb finger are extended).

Moreover, the object recognition unit 27 is also capable of acquiring information about directions in which the finger pads are directed, whether each joint of the finger is extended or bent, and by what angle the joint is bent in a case where it is bent with respect to each of the thumb finger, the index finger, the middle finger, the ring finger, and the little finger.

The hold determination unit 28 and the release determination unit 29 will be described later.

The notification control unit 30 controls the operation of each device in the HMD 2 to notify the user 3 of various types of information.

The notification control unit 30 is capable of notifying the user 3 of the information by, for example, presentation of a sense of touch, display of a virtual image, or output of a sound.

For example, the notification control unit 30 controls the operation of the vibration unit 15 to execute the notification of the information by the presentation of a sense of touch.

Moreover, the notification control unit 30 controls the left and right eye displays 8a and 8b to execute the notification of the information by the display of a virtual image.

Moreover, the notification control unit 30 controls the loudspeaker 14 to execute the notification of the information by the output of a sound.

In addition, any method may be employed as a method of notifying the user 3 of the information. For example, a light source device (illumination device) such as an LED may be mounted on the HDM 2 and lighting of the device may be controlled.

The AR reproduction control unit 31 controls the reproduction of the virtual content to the user 3.

How the virtual object 5 will move, how the virtual sound will be heard, and the like in accordance with the world view of the AR world, for example, are determined. Then, the virtual object 5 is displayed on the see-through display 8 so as to achieve the determined contents. Moreover, the loudspeaker 14 outputs the virtual sound.

As to the display of the virtual object 5, a display position of the virtual object 5 is calculated on the basis of, for example, the three-dimensional coordinates defined by the object recognition unit 27. The calculated display position (three-dimensional coordinates) is converted into two-dimensional coordinates (display coordinates on the see-through display 8) by a homography or the like. The virtual object 5 is displayed at the converted display coordinates. This achieves an AR space where the virtual object 5 is located at a desired position in the real space.

As to the output of the virtual sound, a generation position of the virtual sound (position of a virtual sound source) is calculated on the basis of, for example, the three-dimensional coordinates defined by the object recognition unit 27. An AR space where the virtual sound can be heard from a desired position (desired direction) in the real space is achieved by controlling the loudspeaker 14 to adjust localization of the sound.

A specific algorithm for reproducing the virtual content is not limited. Any control may be executed.

The sending control unit 32 is capable of sending various types of information to the other device via the communication unit 16. For example, the sending control unit 32 is capable of sending to the other device the information and the like stored in the storage unit 20, for example, the information acquired by the information acquisition unit 26, the recognition result acquired by the object recognition unit 27, and the display position of the virtual object 5 calculated by the AR reproduction control unit 31.

For example, the HMDs 2a and 2b illustrated in FIG. 1 are capable of sending and receiving various types of information and data to/from each other.

In the present embodiment, the hold determination unit 28 corresponds to an embodiment of a hold determination unit according to the present technology.

The release determination unit 29 corresponds to an embodiment of a cancel determination unit according to the present technology.

The notification control unit 30 corresponds to an embodiment of a notification control unit according to the present technology.

The storage unit 20 corresponds to an embodiment of a storage unit according to the present technology.

[Hold Determination/Release Determination on Virtual Object]

Figure 4:
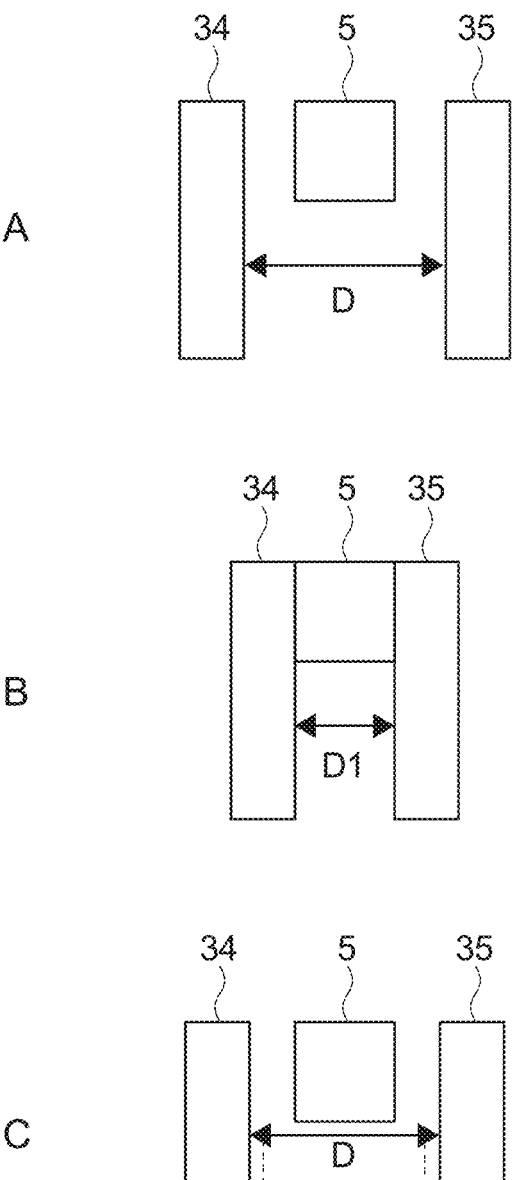
FIG. 4 A view for describing a basic operation of hold determination and release determination on a virtual object.

FIG. 4 is a view for describing a basic operation of hold determination and release determination on the virtual object 5 according to the present embodiment.

The hold determination is processing of determining whether or not the virtual object 5 has been pinched and held. The release determination is processing of determining whether or not the pinched and held virtual object 5 has been released. The release determination can also be said to be processing of determining whether or not the hold of the virtual object 5 has been cancelled.

Moreover, the pinch-and-hold operation can also be said to be grip. Moreover, the expression "pinch/hold" can also be used. Thus, the hold determination can also be said to be grip determination. Moreover, the hold determination can also be said to be pinch determination/hold determination.

As shown in A of FIG. 4, in the present embodiment, a distance D between a first hold-side object 34 and a second hold-side object 35 that set the virtual object 5 as a pinch-and-hold target is calculated.

The first hold-side object 34 and the second hold-side object 35 that set the virtual object 5 as the pinch-and-hold target typically correspond to two objects that attempt to pinch and hold the virtual object 5. The present technology is not limited thereto, and for example two objects set in advance to hold the virtual object 5 may be employed. In addition, what objects are set as the first hold-side object 34 and the second hold-side object 35 is not limited.

Moreover, each of the first hold-side object 34 and the second hold-side object 35 may be the actual object 4 or may be the virtual object 5. Alternatively, each of the first hold-side object 34 and the second hold-side object 35 may be a pair of the actual object 4 and the virtual object 5.

In the present embodiment, in a case where a rate of decrease of the distance D between the first hold-side object 34 and the second hold-side object 35 that attempt to pinch and hold the virtual object 5 becomes smaller than a predetermined threshold value, it is determined that the virtual object 5 has been held by the first hold-side object 34 and the second hold-side object 35.

For example, respective positions of the first hold-side object 34 and the second hold-side object 35 are calculated at a predetermined frame rate. Accordingly, the distance D can be calculated for each frame.

For example, a difference between a distance D acquired for the current frame and a distance D acquired in a past frame preceding it by several frames is divided by a time equivalent to a predetermined number of frames. Accordingly, the rate of decrease of the distance D can be calculated. As a matter of course, another algorithm may be used.

For example, a nearly zero value is set as the predetermined threshold value. As a matter of course, zero may be set as the predetermined threshold value.

Any threshold value with which it can be determined that the decrease in distance D between the first hold-side object 34 and the second hold-side object 35 that attempt to pinch and hold the virtual object 5 has stopped, i.e., the movement of the first hold-side object 34 and the second hold-side object 35 has stopped may be employed.

For example, also after a movement of reducing the distance D in order to pinch and hold the virtual object 5 stops, each of the first hold-side object 34 and the second hold-side object 35 can slightly move (e.g., shake). Therefore, setting the threshold value to be slightly larger than zero can prevent such a slight movement or the like from influencing the hold determination.

The threshold value slightly larger than zero can also be said to be a threshold value with which it can be determined that the movement of the first hold-side object 34 and the second hold-side object 35 has substantially stopped.

Moreover, the rate of decrease of the distance D can also be said to be finger-to-finger velocity. Moreover, velocity in a direction in which the distance D decreases and velocity in a direction in which the distance D increases may be distinguished from each other with positive and negative reference signs, such that those can be both calculated. In this case, a rate of change of the distance D can also be referred to as the finger-to-finger velocity.

B of FIG. 4 is a schematic view showing a state when it is determined that the virtual object 5 has been held. In B of FIG. 4, the first hold-side object 34 and the second hold-side object 35 is held in contact with the virtual object 5.

Each of the first hold-side object 34 and the second hold-side object 35 can be slightly spaced apart from the virtual object 5 when it is actually determined that the virtual object 5 has been held. In addition, each of the first hold-side object 34 and the second hold-side object 35 can also slightly overlap the virtual object 5. That is, the first hold-side object 34 and the second hold-side object 35 can also slightly cave in the virtual object 5.

As to the release determination on the virtual object 5, a distance between the first hold-side object 34 and the second hold-side object 35 when it is determined that the virtual object 5 has been held is first stored as a hold determination distance D1 as shown in B of FIG. 4.

Whether or not the hold of the virtual object 5 by the first hold-side object 34 and the second hold-side object 35 has been cancelled is determined on the basis of the stored hold determination distance D1.

Specifically, as shown in C of FIG. 4, in a case where the distance D between the first hold-side object 34 and the second hold-side object 35 becomes larger than a distance D2 obtained by adding a predetermined threshold value α to the hold determination distance D1, it is determined that the hold has been cancelled.

The distance D2 is a reference distance for the hold cancel determination, i.e., release determination (hereinafter, referred to as a release determination distance D2 with the same reference sign).

Hereinafter, specific embodiments of the hold determination/release determination according to the present technology will be described by taking the AR providing system 1 illustrated in FIG. 1 as an example.

As described above, in the AR providing system 1, the user 3 can pinch and hold the virtual object 5 with his or her hand(s) (fingers). Moreover, the user 3 can also release the pinched and held virtual object 5.

Here, for the sake of description, a case where the user 3 pinches and holds the virtual object 5 with two fingers will be taken as an example. That is, the user 3 can hold the virtual object 5 with any two fingers of five fingers of the thumb finger, the index finger, the middle finger, the ring finger, and the little finger of the right hand and five fingers of the thumb finger, the index finger, the middle finger, the ring finger, and the little finger of the left hand, a total of ten fingers.

Figure 5:
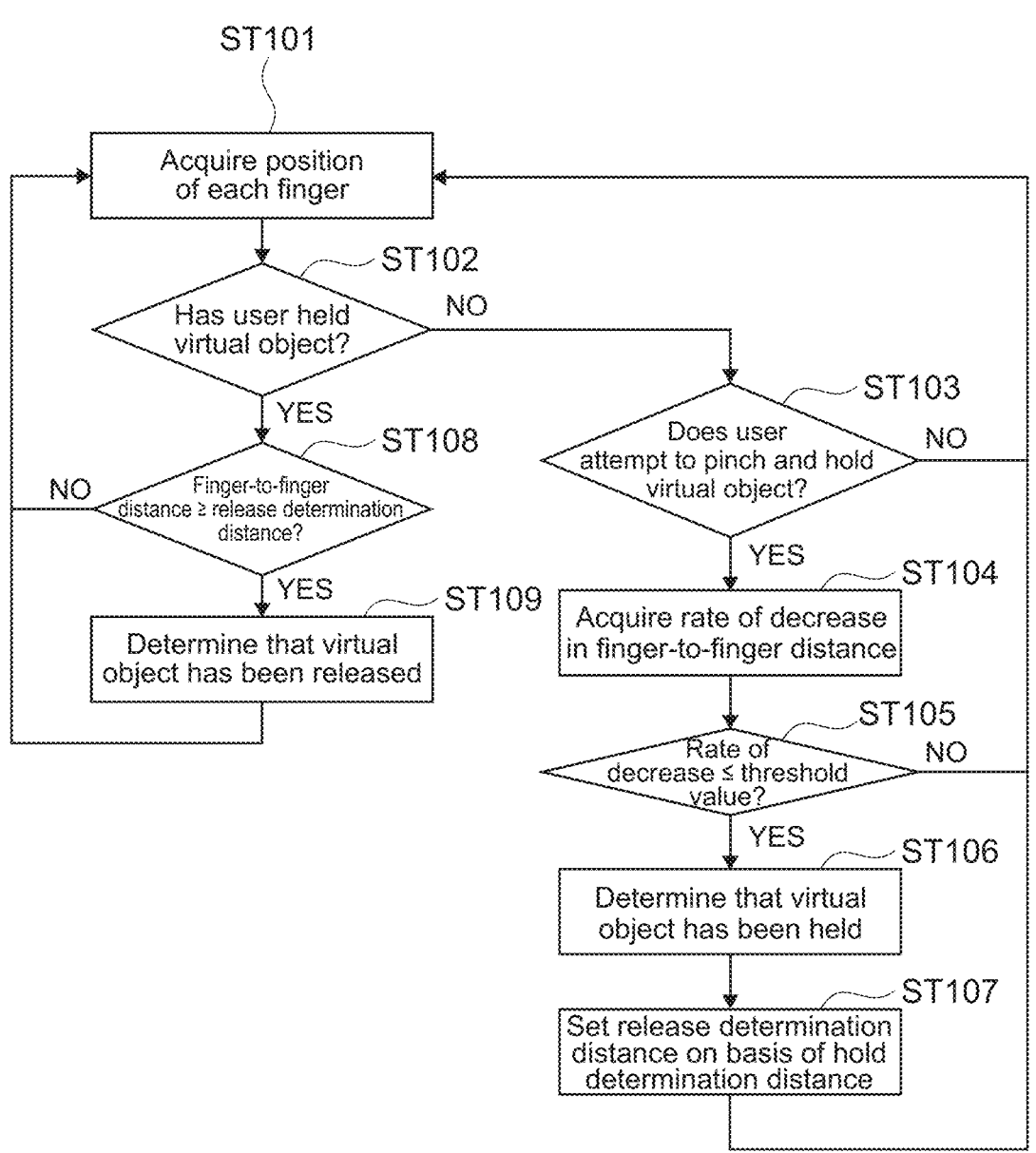
FIG. 5 A flowchart showing a processing example of the hold determination/release determination.

FIG. 5 is a flowchart showing a processing example of the hold determination/release determination according to the present embodiment.

Figure 6:
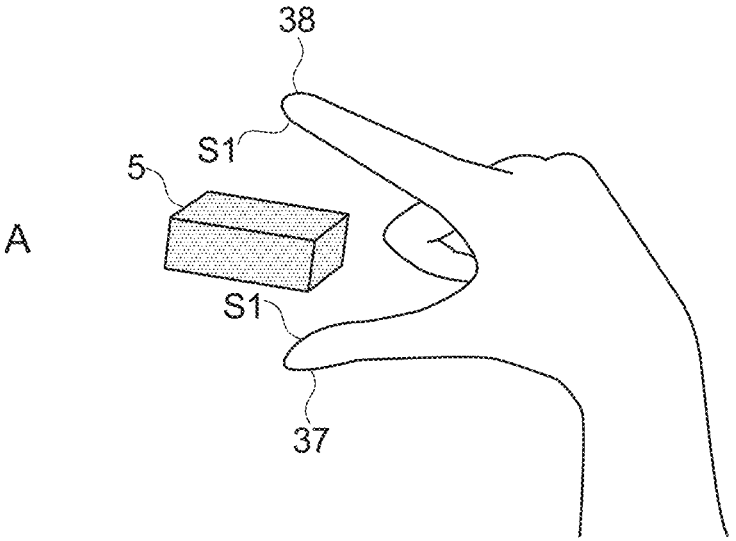
FIG. 6 A schematic view for describing each step shown in FIG. 5.
Figure 6:
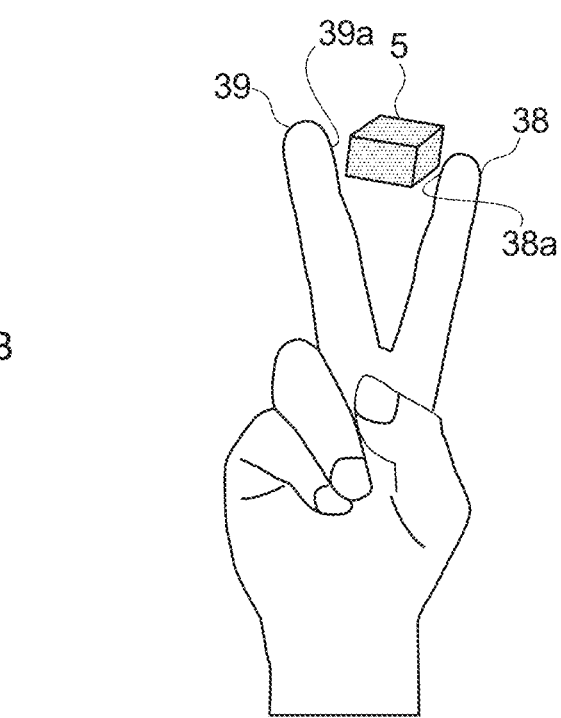
Figure 7:
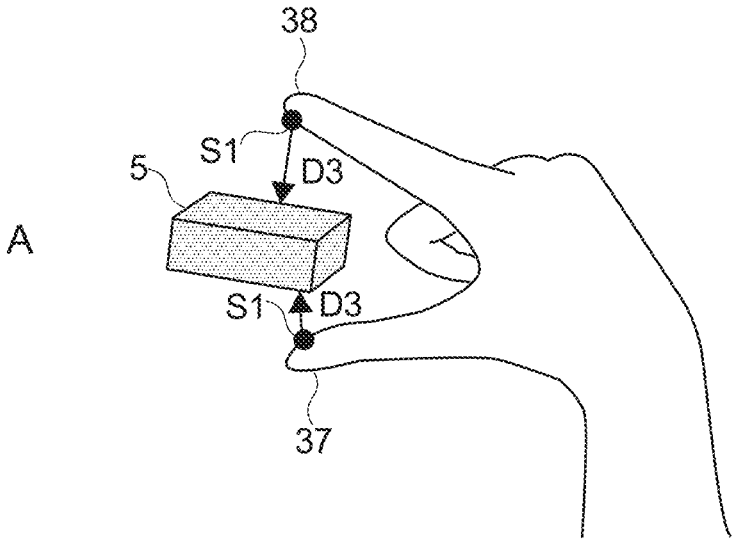
FIG. 7 A schematic view for describing each step shown in FIG. 5.
Figure 7:
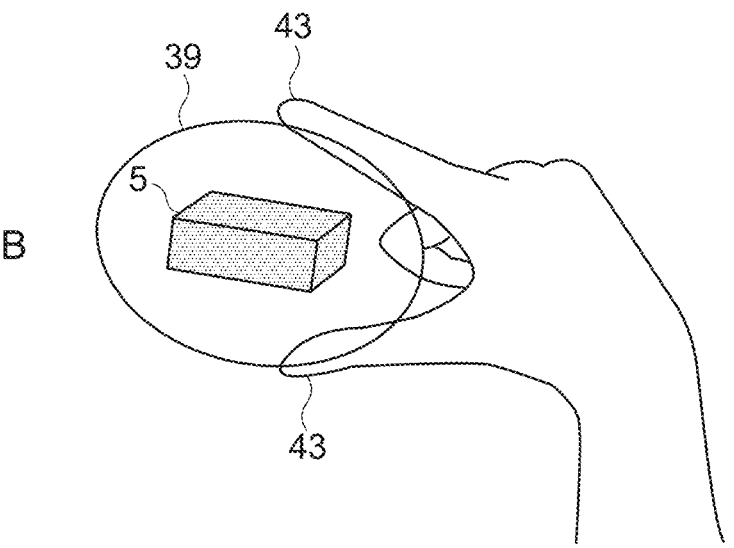
Figure 8:
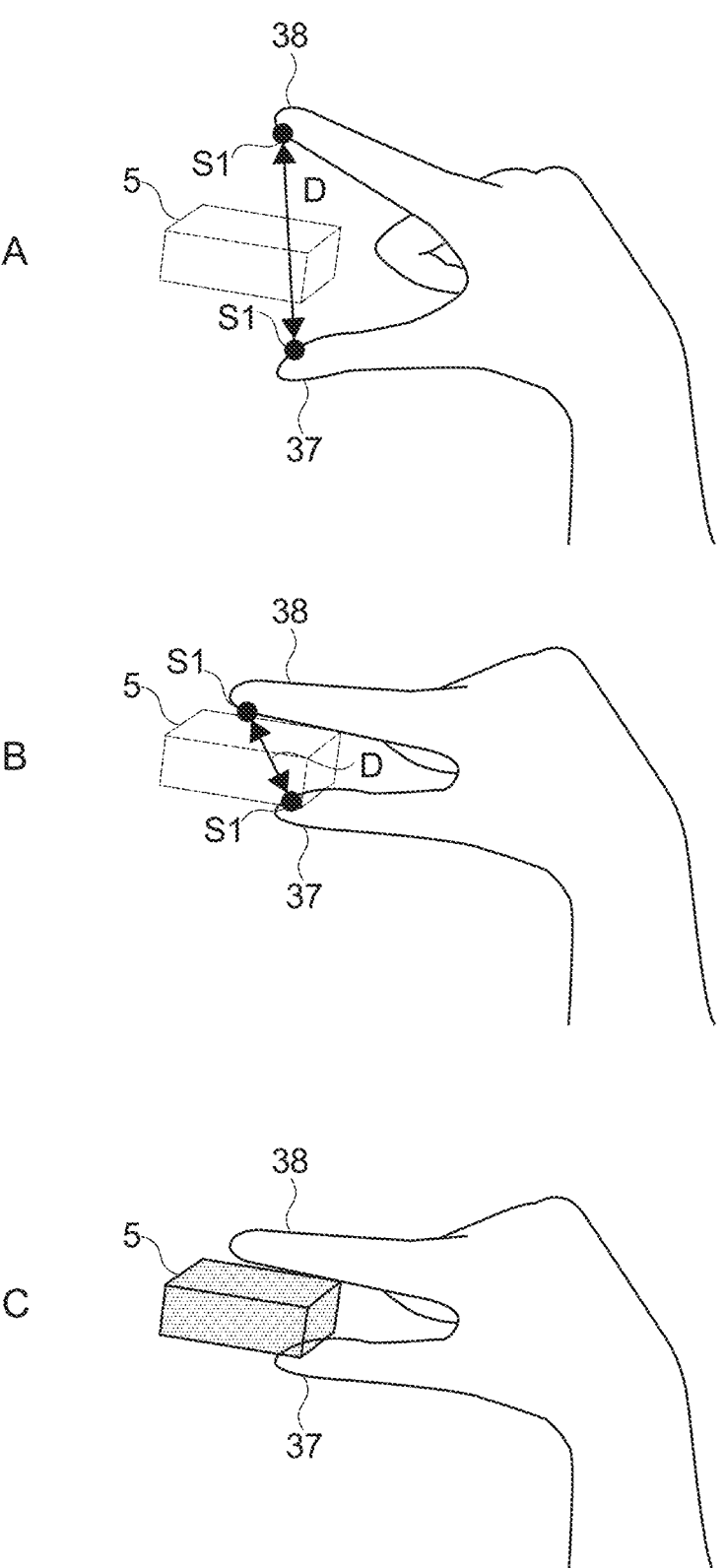
FIG. 8 A schematic view for describing each step shown in FIG. 5.

FIGS. 6 to 8 are schematic views for describing each step shown in FIG. 5.

The processing shown in FIG. 5 is processing executed by the HMD 2 of the user 3. Moreover, the processing shown in FIG. 5 is repeated at a predetermined frame rate, for example. As a matter of course, the present technology is not limited to the case where the processing is executed for each frame.

The hold determination unit 28 acquires a position of each finger of the user 3 (in Step 101). For example, on the basis of a recognition result by the object recognition unit 27, the hold determination unit 28 is capable of acquiring a position of each finger of the user 3.

For example, with respect to each finger, a position of a finger pad of a DIP joint is acquired as the finger position. Alternatively, for example a position of a center of weight of each finger may be acquired as the finger position. In addition, information for defining the finger position is not limited.

The hold determination unit 28 determines whether or not the user 3 has held the virtual object 5 (in Step 102).

In a case where the user 3 has not held the virtual object 5 with the two fingers (No in Step 102), the hold determination unit 28 determines whether or not the user attempts to pinch and hold the virtual object 5 with the two fingers (in Step 103).

The determination in Step 102 and 103 can be executed, for example, on the basis of a recognition result by the object recognition unit 27.

Some variations of the determination in Step 103 will be described. One of the following variations may be employed or a plurality of variations may be employed in combination.

For example, in a case where the user 3 directs the finger pads of the two fingers towards the virtual object 5, it is determined that the user attempts to pinch and hold the virtual object 5 with the two fingers.

In the example shown in A of FIG. 6, the user directs finger pads S1 of a thumb finger 37 and an index finger 38 of the right hand towards the virtual object 5. In this case, it is determined that the user attempts to pinch and hold the virtual object 5 with the thumb finger 37 and the index finger 38.

For example, the user directs the finger pad S1 of the index finger 38 only towards the virtual object 5. In this case, it is determined that the user does not attempt to pinch and hold the virtual object 5 because it is impossible to pinch and hold the virtual object 5 with a single finger.

Otherwise, in a case where the user 3 directs portions of the two adjacent fingers, which face each other, towards the virtual object 5, it is determined that the user attempts to pinch and hold the virtual object 5 with the two fingers.

In the example shown in B of FIG. 6, the user directs portions of the index finger 38 and a middle finger 39 of the right hand, which face each other, towards the virtual object 5. That is, a portion 38a of the index finger 38, which faces the middle finger 39, and a portion 39a of the middle finger 39, which faces the index finger 38, are directed towards the virtual object 5.

In this case, it is determined that the user attempts to pinch and hold the virtual object 5 with the index finger 38 and the middle finger 39.

Otherwise, in a case where there are two objects whose distance to the virtual object 5 is smaller than a predetermined threshold value, it is determined that the user attempts to pinch and hold the virtual object 5 with these two objects.

In the example shown in A of FIG. 7, a position of the finger pad S1 of the DIP joint of each finger is acquired as a position of each finger.

The distance to the virtual object 5 from the position of the pad S1 of the thumb finger 37 is a distance D3 between the thumb finger 37 and the virtual object 5 and is smaller than the predetermined threshold value.

The distance to the virtual object 5 from the position of the pad S1 of the index finger 38 is a distance D3 between the index finger 38 and the virtual object 5 and is smaller than the predetermined threshold value.

In this case, it is determined that the user attempts to pinch and hold the virtual object 5 with the thumb finger 37 and the index finger 38.

It should be noted that the threshold value related to the distance may be about 3 cm, for example. The present technology is not limited thereto, and any value may be set as the threshold value related to the distance.

Otherwise, in a case where two objects are determined to have collided with the virtual object 5, it is determined that the user attempts to pinch and hold the virtual object 5 with these two objects.

The collision determination can be executed on the basis of a collider 43 set to the virtual object 5 for example as shown in B of FIG. 7.

In B of FIG. 7, the thumb finger 37 and the collider 43 set to the virtual object 5 collide with each other. Moreover, the index finger 38 and the collider 43 set to the virtual object 5 collide with each other.

In this case, it is determined that the user attempts to pinch and hold the virtual object 5 with the thumb finger 37 and the index finger 38.

It should be noted that colliders may be respectively set to the thumb finger 37 and the index finger 38 and the collision determination may be executed by the use of these colliders.

In addition, any algorithm may be used for the determination in Step 103.

In the present embodiment, the hold determination unit 28 sets the two objects which attempt to pinch and hold the virtual object 5 as the first hold-side object 34 and the second hold-side object 35 shown in FIG. 4.

Therefore, in Step 103, in a case where the two fingers which attempt to pinch and hold the virtual object 5 are detected, these two fingers are set as the first hold-side object 34 and the second hold-side object 35.

For example, in the example shown in A of FIG. 6, the thumb finger 37 and the index finger 38 are set as the first hold-side object 34 and the second hold-side object 35.

That is, in a case where the user 3 directs the finger pads of the two fingers towards the virtual object 5, the hold determination unit 28 sets these two fingers as the first hold-side object 34 and the second hold-side object 35, respectively.

In the example shown in B of FIG. 6, the index finger 38 and the middle finger 39 are set as the first hold-side object 34 and the second hold-side object 35.

That is, in a case where the user 3 directs portions of the two adjacent fingers, which face each other, towards the virtual object 5, the hold determination unit 28 sets these two fingers as the first hold-side object 34 and the second hold-side object 35, respectively.

In the example shown in A of FIG. 7, the thumb finger 37 and the index finger 38 are set as the first hold-side object 34 and the second hold-side object 35.

That is, the hold determination unit 28 sets two objects whose distance to the virtual object 5 is smaller than the predetermined threshold value as the first hold-side object 34 and the second hold-side object 35, respectively.

In the example shown in B of FIG. 7, the thumb finger 37 and the index finger 38 are set as the first hold-side object 34 and the second hold-side object 35.

That is, the hold determination unit 28 sets two objects determined to have collided with the virtual object 5 as the first hold-side object 34 and the second hold-side object 35, respectively.

In Step 103, in a case where it is determined that the user does not attempt to pinch and hold the virtual object 5 with the two fingers, the processing returns to Step 102.

In Step 103, in a case where it is determined that the user attempts to pinch and hold the virtual object 5 with the two fingers, the hold determination unit 28 acquires a rate of decrease of the finger-to-finger distance (the distance D between the two fingers shown in FIG. 4) (in Step 104).

For example, a difference between a finger-to-finger distance D acquired for the current frame and a finger-to-finger distance D acquired several frames before is divided by a time equivalent to several frames. As a matter of course, any other method may be used as a method of calculating the rate of decrease of the finger-to-finger distance D.

In the example shown in A of FIG. 8, a position of the finger pad S1 of the DIP joint of each finger of the user 3 is acquired as the finger position. Then, a distance between the finger pads S1 of the thumb finger 37 and the index finger 38 which attempt to pinch and hold the virtual object 5 is acquired as a finger-to-finger distance D. A rate of decrease of the finger-to-finger distance D is acquired.

The hold determination unit 28 determines whether or not the rate of decrease of the finger-to-finger distance D becomes equal to or smaller than a predetermined threshold value (in Step 105). Any value may be set as the predetermined threshold value. Moreover, the hold determination unit 28 may determine whether or not the rate of decrease becomes smaller than the predetermined threshold value.

In a case where the rate of decrease of the finger-to-finger distance D does not become equal to or smaller than the predetermined threshold value (No in Step 105), the processing returns to Step 101.

In a case where the rate of decrease of the finger-to-finger distance D becomes equal to or smaller than the predetermined threshold value, the hold determination unit 28 determines that the virtual object 5 has been held by the two fingers (in Step 106).

As shown in B of FIG. 8, the user 3 feels the thickness of the virtual object 5 and stops the operation of making the thumb finger 37 and the index finger 38 approach each other at the finger-to-finger distance D where the user feels that the user has gripped the virtual object 5.

As shown in C of FIG. 8, the hold determination unit 28 is capable of determining that the virtual object 5 has been held in accordance with a hold operation made by the user 3 following his or her feeling. As a result, a high-quality virtual experience can be achieved.

In a case where it is determined that the virtual object 5 has been held by the two fingers, then the distance between the two fingers when it is determined that the virtual object 5 has been held is stored as the hold determination distance D1 (see FIG. 4). Then, the release determination distance D2 (see FIG. 4) is set on the basis of the hold determination distance D1 (in Step 107).

The release determination distance D2 is a distance obtained by adding a predetermined threshold value α to the hold determination distance D1. Any value may be set as the predetermined threshold value α.

The release determination distance D2 is stored in the storage unit 20. Then, the processing returns to Step 101.

In Step 102, in a case where it is determined that the user 3 has held the virtual object 5 (Yes in Step 102), the release determination unit 29 executes release determination.

The release determination unit 29 determines whether or not the finger-to-finger distance D between the two fingers is equal to or larger than the release determination distance D2 (in Step 108).

In a case where the finger-to-finger distance D is not equal to or larger than the release determination distance D2 (No in Step 108), the release determination unit 29 determines that the virtual object 5 has not been released. Then, the processing returns to Step 101. In this case, the hold of the virtual object 5 by the two fingers is maintained.

In a case where the finger-to-finger distance D is equal to or larger than the release determination distance D2 (Yes in Step 108), the release determination unit 29 determines that the virtual object 5 has been released. That is, the release determination unit 29 determines that the hold of the virtual object 5 by the two fingers has been cancelled (in Step 109).

The hold determination distance D1 is a finger determination distance D where the user 3 feels that the user 3 has gripped the virtual object 5. Thus, the release determination distance D2 set on the basis of the hold determination distance D1 is also a determination distance following the feeling of the user 3.

For releasing the virtual object 5, the user 3 makes an operation of extending the distance between the two fingers from the finger-to-finger distance D (hold determination distance D1) following the feeling that the user has pinched and held the virtual object 5.

The release determination unit 29 is capable of determining that the virtual object 5 has been released in accordance with such an operation made by the user 3 following his or her feeling. As a result, a high-quality virtual experience can be achieved.

Moreover, the hold state is maintained until it is determined that it has been released even if the finger-to-finger distance D is increased or reduced. Thus, it is possible to sufficiently prevent a determination that it has been released from being made because of small noise. Thus, it is possible to sufficiently prevent the virtual object 5 from dropping even though the user 3 does not wish to release it.

In Step 101, the positions of the respective fingers (in particular, the fingers holding the virtual object 5) may not be acquired and may be lost. For example, the virtual object 5 and the hand holding it may depart from the effective field-of-view for example when the user 3 swings around the hand holding the virtual object 5. In such a case for example, the position of each finger may be lost.

In this case, execution of the release determination by the release determination unit 29 is limited. In other words, the release determination is not executed. A finger-to-finger distance D is calculated anew and the release determination is executed after the lost finger position is restored.

Accordingly, the hold of the virtual object 5 can be maintained even in a case where the position of each finger is lost. It is possible to prevent for example a case where the virtual object 5 undesirably drops without noticing while the user 3 is swinging around the hand holding the virtual object 5.

The AR reproduction control unit 31 controls reproduction of the virtual content to the user 3 as appropriate on the basis of a determination result by the hold determination unit 28 and a determination result by the release determination unit 29.

For example, a virtual image in which the virtual object 5 held by the fingers of the user 3 moves in accordance with a movement of the hand of the user 3 is displayed. A virtual sound is output from the virtual object 5 held by the hand of the user 3.

Moreover, a virtual image in which the virtual object held by the fingers of the user 3 drops is displayed. Otherwise, a virtual sound when the hand of the user 3 drops is output.

In addition, any virtual representation may be achieved.

As to a threshold value that is a reference for the hold determination in Step 105, the threshold value may be adjusted as appropriate on the basis of the movement of the hand (fingers) of the user 3.

For example, in a case where the movement of the hand including the two fingers determined to attempt to pinch and hold the virtual object 5 is large (in a case where the moving velocity is high), the threshold value in Step 105 is set to be large. In a case where the movement of the hand including the two fingers is small (in a case where the moving velocity is low), the threshold value in Step 105 is set to be small.

In a case where the movement of the hand is large, a change in the finger-to-finger distance D will likely occur even when the user has stopped the movement of the fingers in order to hold the virtual object 5. On the other hand, in a case where the movement of the hand is small, a change in the finger-to-finger distance D when the user has stopped the movement of the fingers in order to hold the virtual object 5 will hardly occur or such a change will be very small.

Therefore, increasing the threshold value as the movement of the hand increases enables high-accuracy hold determination according to the movement of the hand. For example, an operation of catching the virtual object 5 while moving the hand can be achieved with high accuracy.

Moreover, in the present embodiment, the determination as to whether the user attempts to hold the virtual object 5 precedes the hold determination. Accordingly, it is possible to prevent the hold determination from being executed on two objects that does not attempt to hold the virtual object 5. As a result, the usability for the user 3 can be improved.

Figure 9:
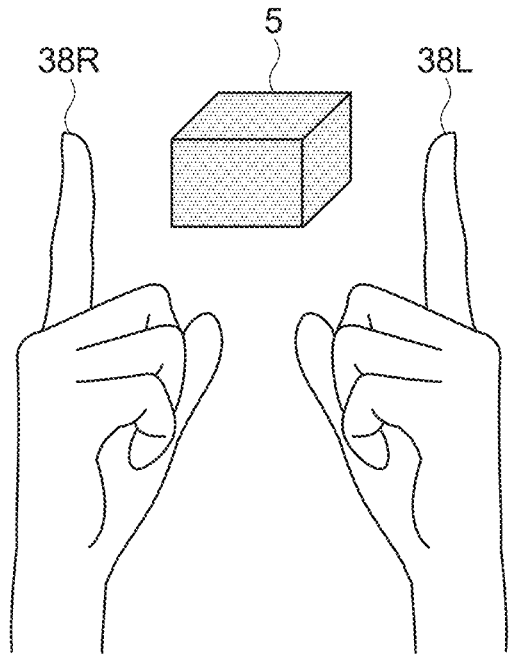
FIG. 9 A schematic view showing another example of a hold operation of a user.
Figure 10:
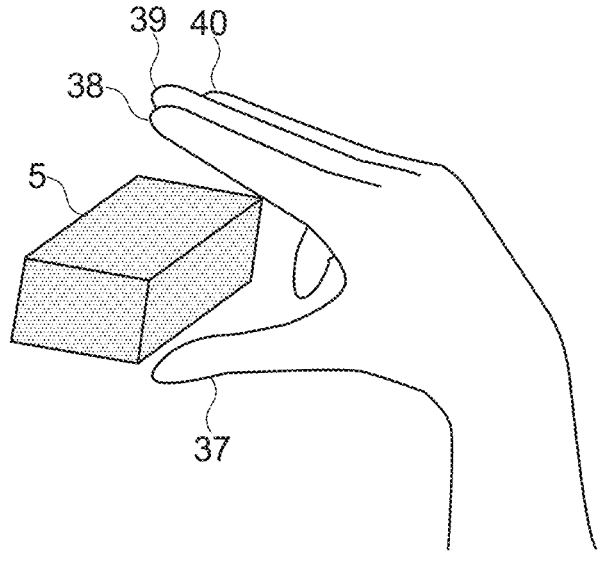
FIG. 10 A schematic view showing another example of the hold operation of the user.

FIGS. 9 and 10 are schematic views showing other examples of the hold operation by the user 3.

The present technology can also be applied in a case where the virtual object 5 is pinched and held by an index finger 38R of the right hand and an index finger 38L of the left hand as shown in FIG. 9.

As a matter of course, the present technology can also be applied in a case where the virtual object 5 has been held by any finger of the right hand and any finger of the left hand.

As shown in FIG. 10, the same side-surface portion of the virtual object 5 may be held by a plurality of fingers.

In the example shown in FIG. 10, a lower portion of the virtual object 5 is held by the thumb finger 37 and an upper portion of the virtual object 5 is held by three fingers, i.e., the index finger 38, the middle finger 39, and a ring finger 40.

Thus, the present technology can also be applied in a case where the first hold-side object 34 and the second hold-side object 35 shown in FIG. 4 are set in any combination as follows.

The first hold-side object 34 . . . one or more predetermined fingers of the user 3.

The second hold-side object 35 . . . one or more other fingers different from the one or more predetermined fingers of the user 3.

In the example shown in FIG. 10, the thumb finger 37 of the user 3 and one or more other fingers (the index finger 38, the middle finger 39, and the ring finger 40) of the same hand as the thumb finger 37 are set as the first hold-side object 34 and the second hold-side object 35.

For example, the number of fingers that pinches and holds the virtual object 5 is set in advance. In the example shown in FIG. 10, a setting is made so that the virtual object 5 should be held by the thumb finger 37 and the three other fingers. The index finger 38, the middle finger 39, and the ring finger 40 may be specified as the three other fingers.

In Step 103 of FIG. 5, it is determined that the user attempts to pinch and hold the virtual object 5, for example, in a case where all the finger pads S1 of the thumb finger 37 and the three other fingers have been directed towards the virtual object 5.

In an instance where the index finger 38, the middle finger 39, and the ring finger 40 have been specified as the three other fingers, it is determined that the user attempts to pinch and hold the virtual object 5 in a case where the user has directed the finger pads S1 of all of the thumb finger 37, the index finger 38, the middle finger 39, and the ring finger 40 towards the virtual object 5.

Otherwise, in a case where the distance to the virtual object 5 from all of the thumb finger 37 and the three other fingers is smaller than the predetermined threshold value, it is determined that the user attempts to pinch and hold the virtual object 5.

In an instance where the index finger 38, the middle finger 39, and the ring finger 40 have been specified as the three other fingers, it is determined that the user attempts to pinch and hold the virtual object 5 in a case where the distance to the virtual object 5 from all of the thumb finger 37, the index finger 38, the middle finger 39, and the ring finger 40 is smaller than the predetermined threshold value.

Otherwise, in a case where all of the thumb finger 37 and the three other fingers are determined to have collided with the virtual object 5, it is determined that the user attempts to pinch and hold the virtual object 5.

In an instance where the index finger 38, the middle finger 39, and the ring finger 40 have been specified as the three other fingers, it is determined that the user attempts to pinch and hold the virtual object 5 in a case where all of the thumb finger 37, the index finger 38, the middle finger 39, and the ring finger 40 are determined to have collided with the virtual object 5.

In an instance where a plurality of fingers has been set as the first hold-side object 34 or the second hold-side object 35, the hold determination of the virtual object 5 can be executed by using, for example, a position of a center of weight of the plurality of fingers as a reference.

For example, in the example shown in FIG. 10, Steps 104 and 105 in FIG. 5 can be executed by setting a distance between a position of a center of weight of the index finger 38, the middle finger 39, and the ring finger 40 and a position of the thumb finger 37 as the finger-to-finger distance D.

For example, a center of weight of three positions, i.e., the position of the index finger 38 (e.g., the position of the finger pad S1), the position of the middle finger 39 (e.g., the position of the finger pad S1), and the position of the ring finger 40 (e.g., the position of the finger pad S1) may be employed as the position of the center of weight of the index finger 38, the middle finger 39, and the ring finger 40. As a matter of course, the present technology is not limited thereto.

Otherwise, a representative finger is selected from among the index finger 38, the middle finger 39, and the ring finger 40. Then, Steps 104 and 105 in FIG. 5 may be executed by setting a distance between the position of the selected representative finger and the position of the thumb finger 37 as the finger-to-finger distance D.

Otherwise, a setting may be made so that the hold determination always uses the position of the index finger 38. That is, the finger to be used for the determination may be specified.

Figure 11:
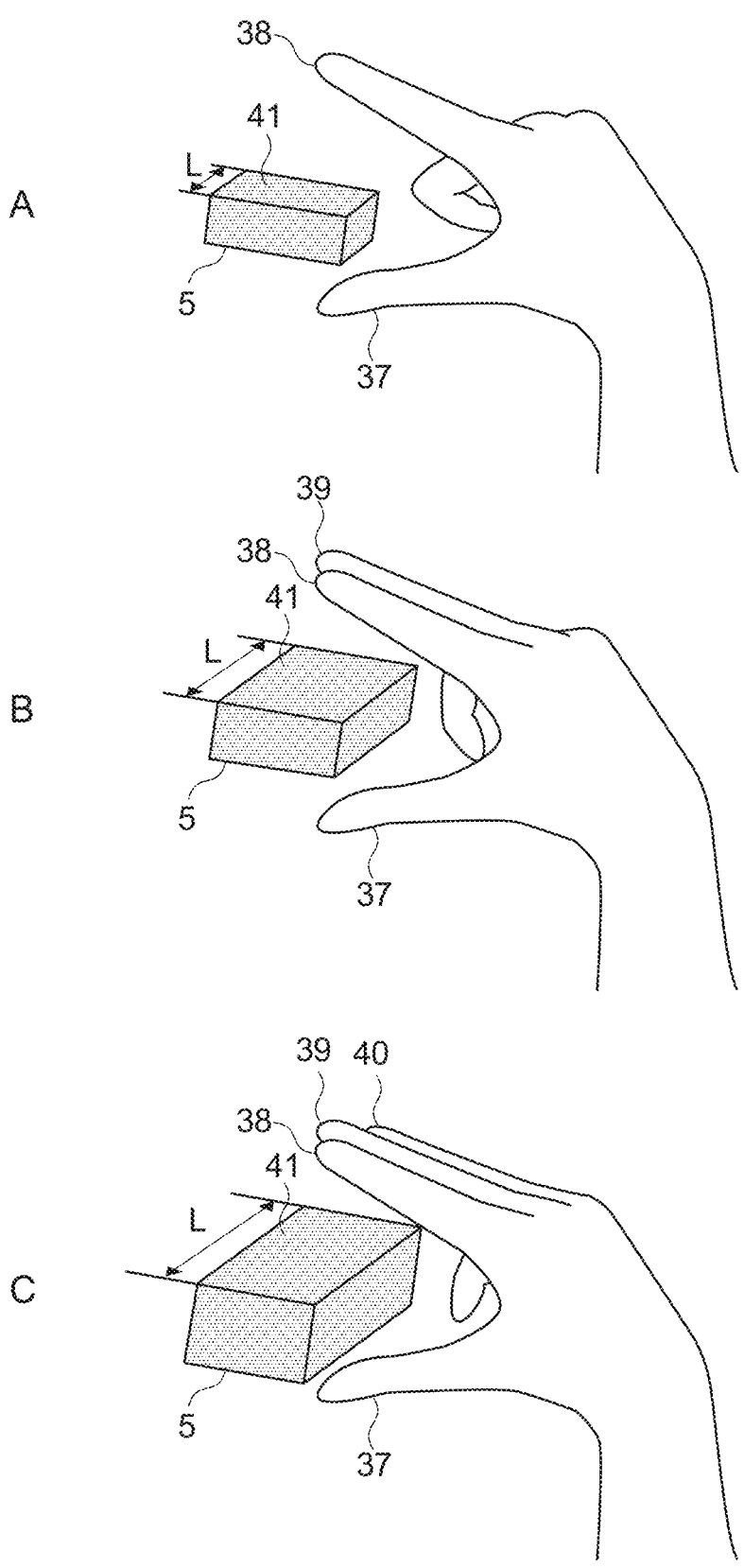
FIG. 11 A schematic view for describing another embodiment of the hold determination.

FIG. 11 is a schematic view for describing another embodiment of the hold determination.

In the example shown in FIG. 11, the thumb finger 37 and one or more other fingers of the same hand as the thumb finger 37 are set as the first hold-side object 34 and the second hold-side object 35.

Moreover, as shown in A to C of FIG. 11, the number of one or more other fingers is set on the basis of a length L of the virtual object 5. That is, the number of fingers necessary for the hold determination of the virtual object 5 is specified in accordance with the length L of the virtual object 5.

In the example shown in FIG. 11, a size of a hold target surface 41 to be held by the one or more other fingers in a direction to the little finger from the index finger 38 is defined as the length L of the virtual object 5. As a matter of course, the present technology is not limited thereto.

In A of FIG. 11, assuming that the length L of the virtual object 5 is smaller than a first threshold (e.g., 15 mm), the number of other fingers that holds the virtual object 5 together with the thumb finger 37 is specified to be one. Thus, the hold determination and the release determination are executed on the thumb finger 37 and the single other finger. Although the case where the index finger 38 is used is shown in A of FIG. 11, another finger may be used.

In B of FIG. 11, assuming that the length L of the virtual object 5 is within a range of the first threshold (e.g., 15 mm) to a second threshold (e.g., 30 mm), the number of other fingers that holds the virtual object 5 together with the thumb finger 37 is specified to be two. Thus, the hold determination and the release determination are executed on the thumb finger 37 and the two other fingers. Although the case where the index finger 38 and the middle finger 39 are used is shown in B of FIG. 11, other fingers may be used.

In C of FIG. 11, assuming that the length L of the virtual object 5 is larger than the second threshold (e.g., 30 mm), the number of other fingers that holds the virtual object 5 together with the thumb finger 37 is specified to be three. Thus, the hold determination and the release determination are executed on the thumb finger 37 and the three other fingers. Although the case where the index finger 38, the middle finger 39, and the ring finger 40 are used is shown in C of FIG. 11, other fingers may be used.

In this manner, the hold determination unit 28 may set the first hold-side object 34 and the second hold-side object 35 on the basis of the size of the virtual object 5.

Otherwise, the hold determination unit 28 may set the first hold-side object 34 and the second hold-side object 35 on the basis of the shape of the virtual object 5.

In addition, any method may be employed as a method of setting the first hold-side object 34 and the second hold-side object 35. For example, two objects closest to the virtual object 5 may be set as the first hold-side object 34 and the second hold-side object 35.

Otherwise, two objects focused by the user 3 may be detected by eye tracking for example and may be set as the first hold-side object 34 and the second hold-side object 35.

As to the release determination in the instance where the plurality of fingers has been set as the first hold-side object 34 or the second hold-side object 35, the release determination may be executed on each of the plurality of fingers. Then, in a case where all the fingers have released the virtual object 5, the virtual object 5 may be determined to have been released.

Otherwise, as described above, the release determination may be executed by using a position of a center of weight of the plurality of fingers as a reference. Otherwise, a representative finger is selected from among the plurality of fingers. Then, the release determination may be executed by using the position of the selected representative finger as a reference.

[Notification of Hold Determination and Release Determination to User]

In the present embodiment, the notification control unit 30 notifies the user 3 of the fact that the virtual object 5 has been held by the first hold-side object 34 and the second hold-side object 35.

Moreover, the notification control unit 30 notifies the user 3 of the fact that the hold of the virtual object 5 by the first hold-side object 34 and the second hold-side object 35 has been cancelled.

It is also possible to employ a configuration in which user is notified of only one of either the fact that notification of the virtual object 5 has been performed or the fact that the hold of the virtual object 5 has been cancelled.

The notification control unit 30 is capable of notifying the user 3 of the fact that the virtual object 5 has been held and the fact that the hold of the virtual object 5 has been cancelled by presentation of a sense of touch, display of a virtual image, or output of a sound or the like.

For example, the notification control unit 30 controls the operation of the vibration unit 15 so that it can notify of the fact that the virtual object 5 has been held and the fact that the hold of the virtual object 5 has been cancelled by presentation of a sense of touch such as a vibration.

Moreover, the notification control unit 30 controls the left and right eye displays 8a and 8b so that it can notify of the fact that the virtual object 5 has been held and the fact that the hold of the virtual object 5 has been cancelled by display of a virtual image.

Moreover, the notification control unit 30 controls the loudspeaker 14 so that it can notify of the fact that the hold of the virtual object 5 has been cancelled by output of a sound.

In addition, any method may be employed.

Figure 12:
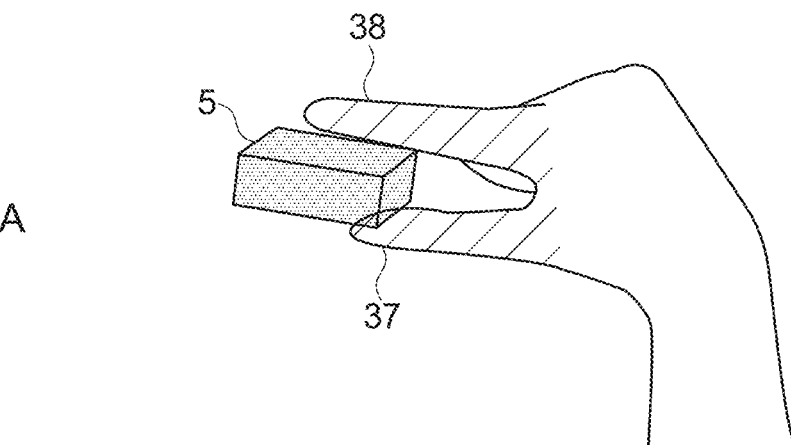
FIG. 12 A schematic view showing an example of notifying the user.
Figure 12:
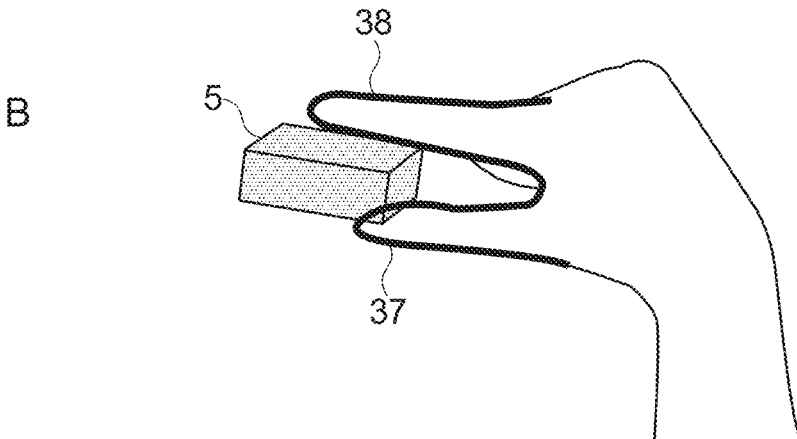
Figure 12:
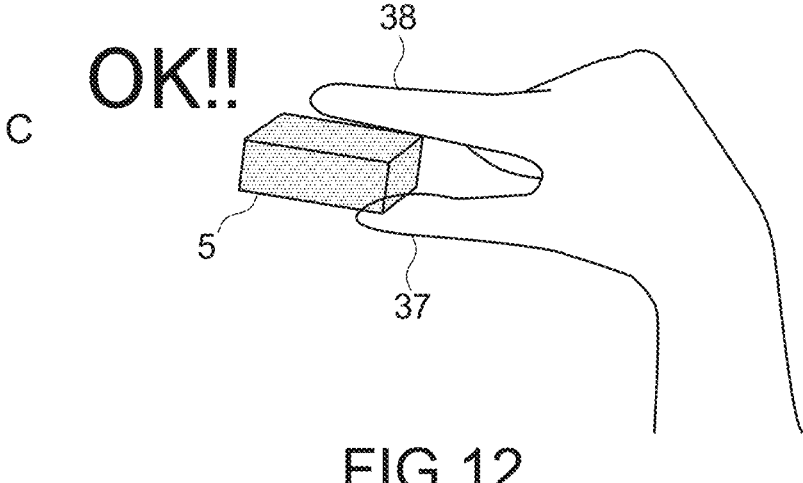

FIG. 12 is a schematic view showing an example of notifying the user 3.

In the example shown in A of FIG. 12, a virtual image in which the thumb finger 37 and the index finger 38 pinching and holding the virtual object 5 are lit up is displayed.

In the example shown in B of FIG. 12, a virtual image in which the contour of the thumb finger 37 and the index finger 38 pinching and holding the virtual object 5 is lit up is displayed.

In the example shown in C of FIG. 12, the text image "OK!!" is displayed as the virtual image.

Displaying the virtual image in this manner enables visual feedback to the user 3. As a result, the user 3 can easily know that the user 3 has successfully held the virtual object 5, and a high-quality virtual experience can be achieved.

In the examples of A to C of FIG. 12, the release determination unit 29 has determined that the hold of the virtual object 5 by the thumb finger 37 and the index finger 38 has been cancelled. In this case, the virtual representation lighting up the thumb finger 37 and the index finger 38, the virtual representation lighting up the contour of the thumb finger 37 and the index finger 38, or the display of the text image "OK!!" is cancelled.

Accordingly, the user 3 can easily know that the user 3 has released the virtual object 5.

Any method may be employed as a method of notifying of the fact that the virtual object 5 has been held and the fact that the hold of the virtual object 5 has been cancelled.

For example, a vibration in a particular pattern may be generated for notifying the user of the fact that the virtual object 5 has been held. The vibration may be stopped for notifying the user of the fact that the hold has been cancelled.

Otherwise, the voice saying "You have grasped the model car (virtual object 5)" or "You have released the model car (virtual object 5)" may be output from the loudspeaker 14.

When the user grips the actual object 4 in the real world, the user receives haptic information fed back from the actual object 4. When the user releases the actual object 4, the user perceives that the user has released it because the user receives no haptic information. However, the user does not receive a haptic feedback associated with it from the virtual object 5.

In the present embodiment, various devices provided in the HMD 2 performs feedback using a visual representation, a sound, and a sense of touch. Accordingly, the user can easily know the fact that the virtual object 5 has been held and the fact that the virtual object 5 has been released, and a high-quality virtual experience can be achieved.

As a matter of course, the feedback to the user 3 may be performed from a device other than the HMD 2.

Figure 13:
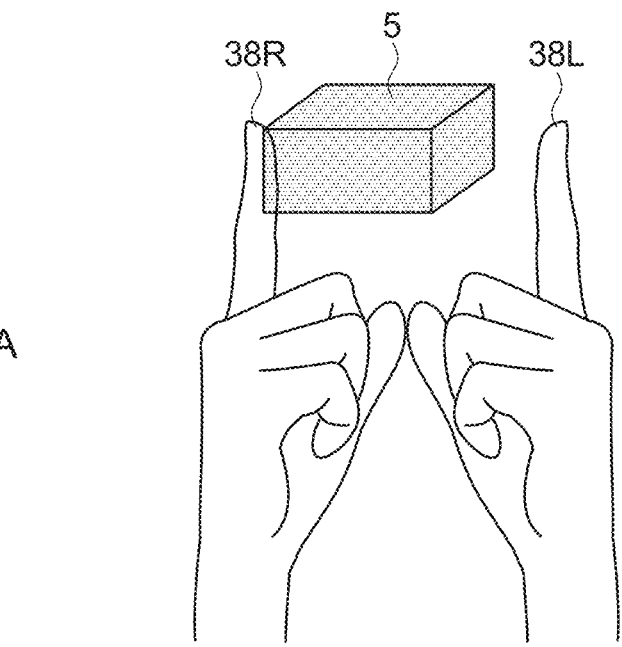
FIG. 13 A schematic view for describing a display example of virtual images of a first hold-side object and a second hold-side object.
Figure 13:
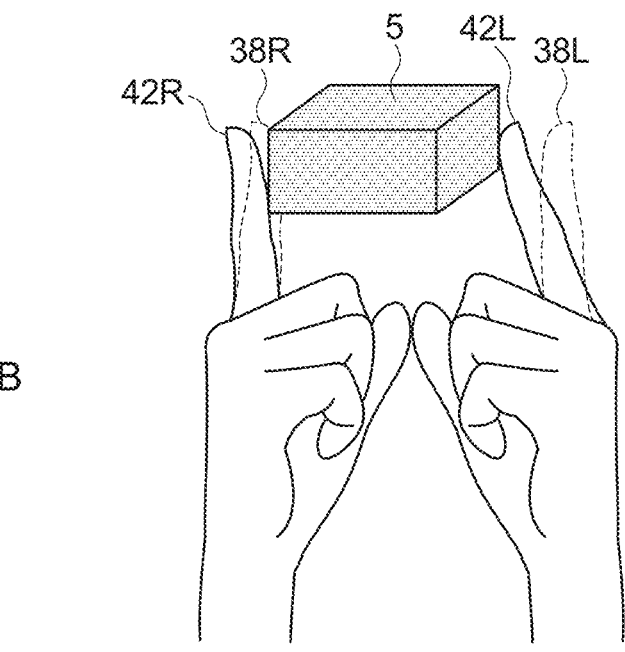

FIG. 13 is a schematic view for describing a display example of virtual images of the first hold-side object 34 and the second hold-side object 35.

A of FIG. 13 is a schematic view showing a state when it is determined that the virtual object 5 has been held.

B of FIG. 13 is a schematic view of a state in which virtual images of the first hold-side object 34 and the second hold-side object 35 have been displayed.

As shown in A of FIG. 13, when it is determined that the virtual object 5 has been held, the first hold-side object 34 or the second hold-side object 35 holding the virtual object 5 may be spaced apart from the virtual object 5.

Moreover, when it is determined that the virtual object 5 has been held, the first hold-side object 34 or the second hold-side object 35 holding the virtual object 5 may overlap the virtual object 5.

In the example shown in A of FIG. 13, the index finger 38L of the left hand is spaced apart from the virtual object 5. Moreover, the index finger 38R of the right hand overlaps the virtual object 5 and caves in the virtual object 5.

For example, in a case where the finger-to-finger distance D is larger than the width of the virtual object 5 or in a case where the finger-to-finger distance D is smaller than the width of the virtual object 5, the finger(s) can be spaced apart from the virtual object 5 or can overlap the virtual object 5.

As shown in B of FIG. 13, in the present embodiment, the notification control unit 30 displays the virtual image of the hold-side object spaced apart from the virtual object 5 in such a manner that it is held in contact with the surface of the virtual object 5.

Moreover, the notification control unit 30 displays the virtual image of the hold-side object overlapping the virtual object 5 in such a manner that it is held in contact with the surface of the virtual object 5.

In the example shown in B of FIG. 13, a model image 42L of the index finger 38L of the left hand and a model image 42R of the index finger 38R of the right hand are generated as virtual images. The model images 42L and 42R are displayed in such a manner that it is held in contact with the surface of the virtual object 5.

At this time, the index finger 38L of the left hand and the index finger 38R of the right hand that are the actual objects 4 are hidden from the effective field-of-view. For example, an image of the background or the like is made to overlap the index finger 38L of the left hand and the index finger 38R of the right hand. In addition, any image processing method may be employed for hiding the actual object 4.

Displaying the virtual images of the first hold-side object 34 and the second hold-side object 35 in this manner can overcome for example a gap between the actual hand and the virtual object 5. As a result, a high-quality virtual experience can be achieved.

It should be noted that although the virtual images of the first hold-side object 34 and the second hold-side object 35 are displayed, it may be configured to be separate from the notification control unit 30. The display of these virtual images may be executed, considering that the operation of notifying of the fact that the virtual object 5 has been held and the fact that the hold of the virtual object 5 has been cancelled is a separate operation.

Hereinabove, in the AR providing system 1 and the HMD 2 according to the present embodiment, in a case where the rate of decrease of the distance between the first hold-side object 34 and the second hold-side object 35 becomes smaller than the predetermined threshold value, it is determined that the virtual object 5 has been held. Accordingly, a high-quality virtual experience can be achieved.

A method of achieving the grip (hold/pinch) operation with respect to the virtual object 5 can be a method of determining that the virtual object 5 has been gripped in a case where the two fingers are held in contact with the virtual object 5.

With this method, there can be a gap between a situation where the contact of the fingers with the virtual object 5 is determined and the feeling of the user 3 who attempts to grip the virtual object 5. In such a case, the user 3 may not successively grasp the virtual object 5 even though the user

3 feels that the user 3 touches and grasps it or the user 3 may touch the virtual object 5 with the fingers even though the user 3 feels that the user 3 does not touch the virtual object 5 yet.

Moreover, also as to the release determination, a method determining that the virtual object 5 is released when the contact of the fingers with the virtual object 5 is cancelled can be used. Also in this case, the user may not successively cancel grip even though the user feels that the user keeps his or her fingers off the virtual object 5 or the user may release the virtual object 5 even though the user does not attempt to do so.

In such a case, it is difficult to perform natural grip operation and release operation on the virtual object 5.

A method of performing grip determination by setting a friction coefficient between the virtual object 5 and the fingers can also be used. However, the grip may become instable, so the virtual object 5 can slip and drop. Thus, it is difficult to perform natural grip operation and release operation on the virtual object 5.

By applying the present technology, it is possible to determine that the virtual object 5 has been held in accordance with the hold operation made by the user 3 following his or her feeling. Moreover, it is possible to determine that the virtual object 5 has been held in accordance with the release operation made by the user 3 following his or her feeling.

When the user 3 attempts to grasp (pinch) the virtual object 5 having a certain size, the user 3 adjusts the finger-to-finger distance D, using his or her feeling in accordance with the size of the virtual object 5. The hold determination and the release determination can be executed in accordance with the finger-to-finger distance D following the feeling of each user 3.

Accordingly, it leads to reduction in the number of grasp mistakes and reduction in time until the user grasps the object. Moreover, the virtual object 5 does not slip and drop from the fingers even when the user moves the virtual object 5 after the user grasps the virtual object 5 and the user can release the virtual object 5 only by slightly opening the fingers following his or her feeling even without largely opening the fingers.

Since the user can intuitively grip the virtual object 5 in accordance with the size of the virtual object 5 in this manner, an enhanced virtual experience can be achieved.

[Wearable Controller]

Figure 14:
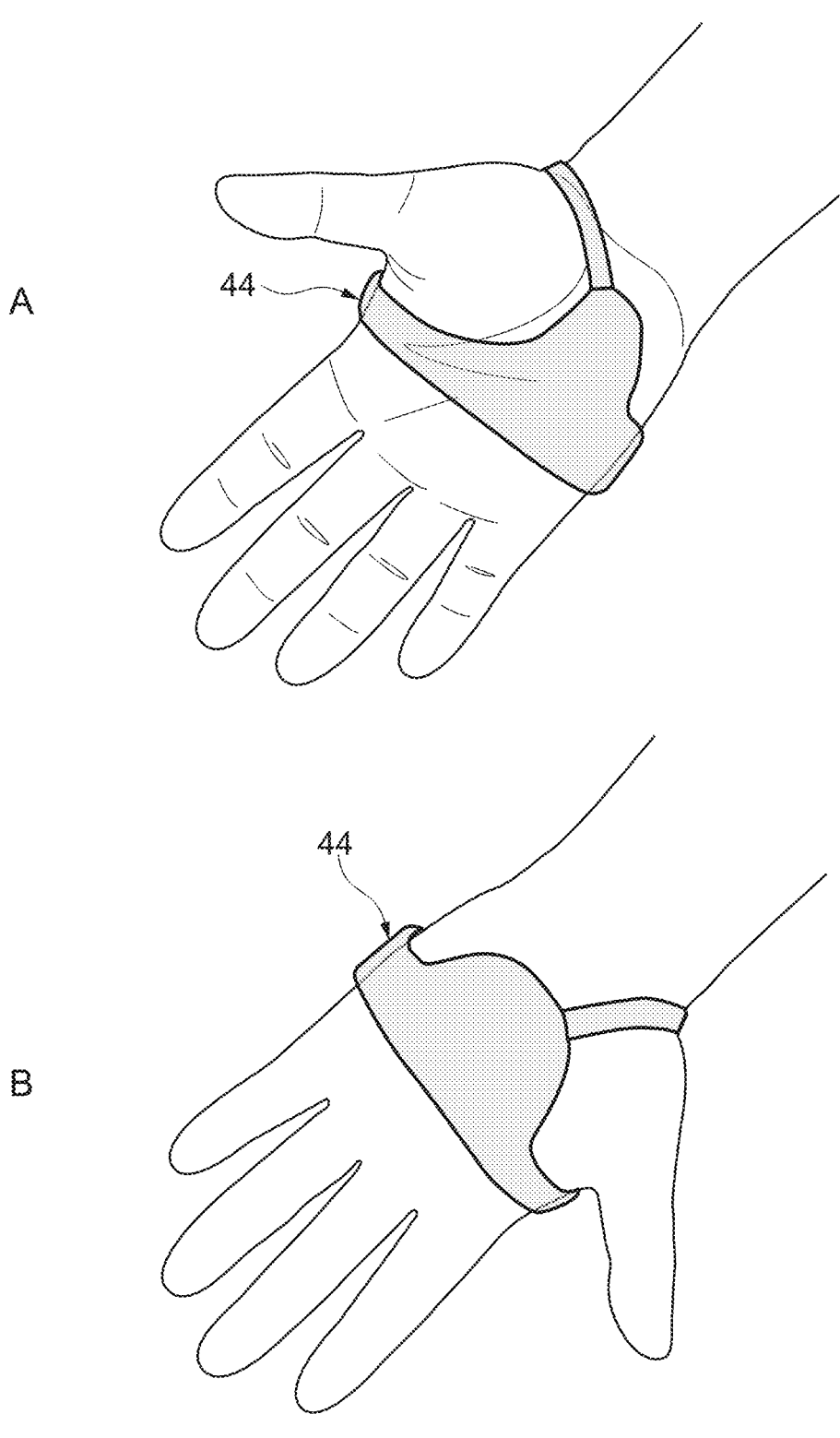
FIG. 14 A schematic view showing an example of a wearable controller.

FIG. 14 is a schematic view showing an example of a wearable controller.

A of FIG. 14 is a schematic view showing an outer appearance of the wearable controller on a palm side.

B of FIG. 14 is a schematic view showing an outer appearance of the wearable controller on a back-of-hand side.

A wearable controller 44 is configured as a so-called palm vest device. The wearable controller 44 is put on the hand of the user 3 for use.

Although the illustration is omitted, various devices such as cameras, a 9-axis sensor, a GPS, a distance measurement sensor, a microphone, an IR sensor, and an optical marker are mounted on predetermined positions of the wearable controller 44.

For example, the cameras are respectively placed on the palm side and the back-of-hand side so that the cameras can image the fingers. Recognition processing of the hand of the user 3 can be executed on the basis of images of the fingers captured by the cameras, detection results (sensor information) from the respective sensors, a sensing result of IR light reflected by the optical marker, and the like.

Therefore, various types of information such as positions, attitudes, and movements of the hand and the respective fingers can be acquired. Moreover, determination of an input operation such as a touch operation, determination of a gesture with the hand, and the like can be executed.

The user 3 can perform a variety of gesture inputs or an operation with respect to the virtual object 5 with his or her hand.

Moreover, although the illustration is omitted, a plurality of vibrators is mounted at predetermined positions of the wearable controller 44 as the tactile presentation unit. By the vibrator being driven, senses of touch in various patterns can be presented to the hand of the user 3. It should be noted that specific configurations of the vibrators are not limited, and any configuration may be employed.

The embodiment of the present technology can also be achieved with such a wearable controller 44.

For example, the AR providing system 1 as shown in FIG. 1 can also be achieved without the HMD 2.

A projector for displaying the virtual object 5 on the table 4a is disposed above or below the table 4a. The user 3 wears the wearable controller 44 shown in FIG. 14 and pinches and holds the box 5a that is the virtual object 5.

A recognition result of each finger of the user 3 can be acquired on the basis of the image and the sensor information from the wearable controller 44. Thus, the hold determination and the release determination according to the present technology as illustrated in FIG. 5 can be executed, and a high-quality AR providing system 1 can be achieved.

Moreover, the wearable controller 44 may notify the user 3 of a result of the hold determination and a result of the release determination. A haptic feedback can be performed for example by driving the plurality of vibrators. As a matter of course, a visual feedback and an audio feedback may be performed by mounting a display unit and a loudspeaker.

It should be noted that the hold determination and the release determination may be executed by another computer (e.g., server apparatus) connected to be capable of communicating with the wearable controller 44. In this case, the other computer functions as an embodiment of the information processing apparatus according to the present technology.

As a matter of course, the wearable controller 44 may execute the hold determination and the release determination. In this case, the wearable controller 44 functions as an embodiment of the information processing apparatus according to the present technology.

In addition, cooperation of the wearable controller 44 with the other computer may achieve the information processing apparatus according to the present technology and may execute the information processing method according to the present technology.

[VR Providing System]

A VR providing system may be configured as an embodiment of the information processing system according to the present technology.

For example, the user 3 wears an immersive HMD 2 configured to cover the field-of-view of the user 3. Then, the user 3 operates a corresponding virtual object movable in accordance with a movement of the user's hand (fingers) within the VR space by moving the user's hand (fingers).

For example, the corresponding virtual object may be a model image of the user's hand (fingers). As a matter of course, the present technology is not limited thereto, and the corresponding virtual object may be a hand (fingers) of a character or robot or may be a virtual image of a tool or the like such as a crane and a tongs.

The present technology can be applied for example in a case where the user pinches and holds the virtual object 5 with the corresponding virtual object or a case where the user releases the virtual object 5.

For example, whether two corresponding virtual objects attempt to pinch and hold the virtual object 5 is determined and those are set as the first hold-side object 34 and the second hold-side object 35.

In a case where the rate of decrease of the distance between the first hold-side object 34 and the second hold-side object 35 becomes smaller than a predetermined threshold value, it is determined that the virtual object 5 has been held by the first hold-side object 34 and the second hold-side object 35.

In a case where the distance between the first hold-side object 34 and the second hold-side object 35 becomes larger than the release determination distance D2 set on the basis of the hold determination distance D1, it is determined that the hold of the virtual object 5 by the first hold-side object 34 and the second hold-side object 35 has been cancelled.

In addition, the various technologies described above may be performed.

In addition, any device may be used for achieving the virtual space.

The present technology is not limited to the devices such as the HMD and the projector described above, and the virtual space may be achieved by using a smartphone, a tablet terminal, a personal computer (PC), or the like.

Other Embodiments

The present technology is not limited to the above-mentioned embodiments, and various other embodiments can be achieved.

The type of the actual object 4 and the virtual object 5 set as the first hold-side object 34 and the second hold-side object 35 are not limited.

The present technology can be applied to any object capable of executing the operation of pinching and holding the virtual object 5 such as chopsticks, pin set, crane, tongs, entire hand, entire arm, entire leg, and toes.

The hold determination distance D1 when the user 3 pinches and holds the same virtual object 5 in the past may be used for the hold determination of the virtual object 5.

That is, in a case where the distance D between the first hold-side object 34 and the second hold-side object 35 becomes equal to the hold determination distance D1 when the user 3 pinches and holds the same virtual object 5 in the past, the hold determination unit 28 may determine that the virtual object 5 has been held by the first hold-side object 34 and the second hold-side object 35.

Once the user 3 grips the virtual object 5, the user 3 often actively or naturally remember the finger-to-finger distance D at that time. Thus, it can be estimated that the grip operation for the same virtual object 5 will be likely to be performed at substantially the same finger-to-finger distance D.

Using the hold determination distance D1 when the same virtual object 5 is pinched in the past enables hold determination according to such a natural grip operation, and a high-quality virtual experience can be achieved.

In a case where the plurality of users 3 is present in the virtual space as shown in FIG. 1, the hold determination distance D1 of the virtual object 5 is stored with respect to each of the plurality of users 3. The hold determination distance D1 set to the other user 3 can be received and stored for example by the HMD 2 communicating with each other.

In this case, the hold determination distance D1 when the other user 3 pinches and holds the same virtual object 5 may be used for the hold determination of the virtual object 5.

That is, in a case where the distance D between the first hold-side object 34 and the second hold-side object 35 becomes equal to the hold determination distance D1 when the other user 3 pinches and holds the same virtual object 5, the hold determination unit 28 may determine that the virtual object 5 has been held by the first hold-side object 34 and the second hold-side object 35.

When the user attempts to grip the virtual object 5 that has been gripped by the other user 3 located in front of the user within the same virtual space, there is a high possibility that the user has seen the other user 3 gripping that virtual object 5 and knows the finger-to-finger distance D at which the other user 3 has gripped such a virtual object 5. It can be estimated that the user 3 will be likely to perform the grip operation at substantially the same finger-to-finger distance D as the finger-to-finger distance D of the other user 3 that the user 3 has seen.

Using the hold determination distance D1 when the other user 3 pinches the same virtual object 5 enables hold determination according to such a natural grip operation, and a high-quality virtual experience can be achieved.

There can a case where the same type of the actual object 4 and the virtual object 5 are present in the virtual space. For example, in the example shown in FIG. 1, the actual object 4 of the model car and the virtual object 5 displayed as a virtual image of the model car may be placed on the table 4a. The model car of the actual object 4 and the model car of the virtual object 5 have the same size. The user 3 can enjoy an application that the model car of the virtual object 5 travels in various ways in the situation where the plurality of model cars is placed.

For example in a case where such a virtual space has been achieved, the distance between the first hold-side object 34 and the second hold-side object 35 (referred to as an actual hold distance) when the actual object 4 corresponding to the virtual object 5 is pinched and held may be used for the hold determination of the virtual object 5.

For example, an actual hold distance is calculated by the object recognition unit 27 of the HMD 2 when the actual object 4 is pinched and held and the actual hold distance is stored in the storage unit 20.

In a case where the distance between the first hold-side object 34 and the second hold-side object 35 becomes equal to the actual hold distance, the hold determination unit 28 determines that the virtual object 5 has been held by the first hold-side object 34 and the second hold-side object 35.

In a case where there are objects with the same size in real and virtual worlds, it is conceivable that the user will be likely to perform the grip operation for the virtual object 5 with the same size at substantially the same distance as the finger-to-finger distance D after the user first grips the actual object 4 of the real world.

Using the actual hold distance when the user grips the actual object 4 enables hold determination corresponding to such a natural grip operation, and a high-quality virtual experience can be achieved.

In the above description, the case where the HMD 2 functions as the embodiment of the information processing apparatus according to the present technology has been taken as the example. The present technology is not limited thereto. Any computer such as a PC connected to the HMD 2 via a network or the like may achieve the embodiment of the information processing apparatus according to the present technology and may execute the information processing method according to the present technology. Moreover, cooperation of the HMD 2 with the computer in the network may achieve the embodiment of the information processing apparatus according to the present technology and may execute the information processing method according to the present technology.

For example, another computer connected to the HMD 2 may achieve some or all of the functional blocks achieved by the controller 21 shown in FIG. 3.

Figure 15:
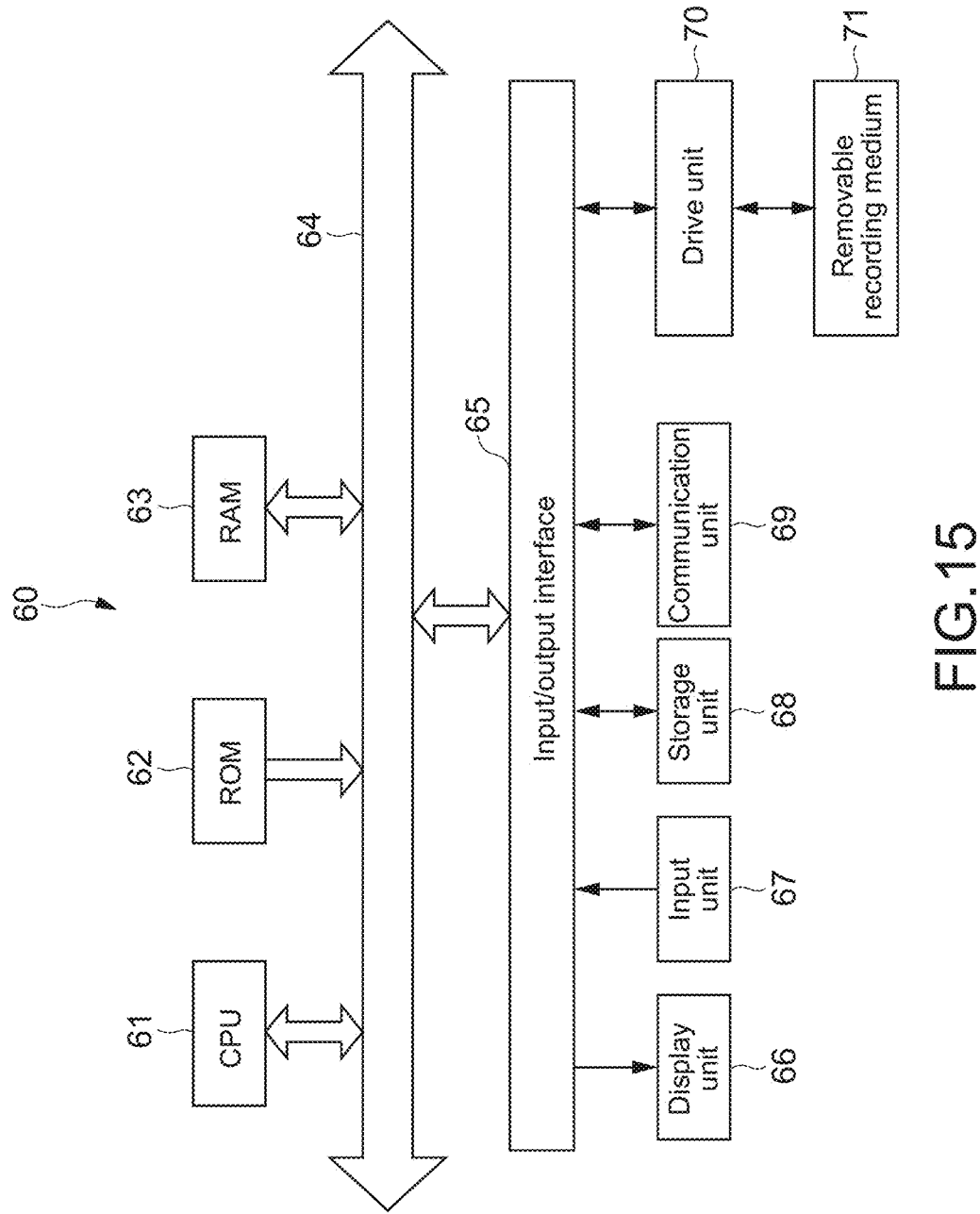
FIG. 15 A block diagram showing a hardware configuration example of a computer that can be applied to the present technology.

FIG. 15 is a block diagram showing a hardware configuration example of a computer 60 that can be applied to the present technology.

The computer 60 includes a CPU 61, a read only memory (ROM) 62, a RAM 63, an input/output interface 65, and a bus 64 for connecting them to one another. A display unit 66, an input unit 67, a storage unit 68, a communication unit 69, and a drive unit 70, for example, are connected to the input/output interface 65.

The display unit 66 is a display device using liquid-crystals or EL, for example. The input unit 67 is, for example, a keyboard, a pointing device, a touch panel, or another operation apparatus. In a case where the input unit 67 includes a touch panel, the display unit 66 can be integral with the touch panel.

The storage unit 68 is a nonvolatile storage device, and is, for example, an HDD, a flash memory, or another solid-state memory. The drive unit 70 is a device capable of driving a removable recording medium 71, e.g., an optical recording medium or a magnetic recording tape.

The communication unit 69 is a modem, a router, or another communication apparatus that is connectable to a LAN, a WAN, or the like and is for communicating with the other device. The communication unit 69 may perform wired communication or may perform wireless communication. The communication unit 69 is often used separate from the computer 60.

Cooperation of software stored in the storage unit 68 or the ROM 62, for example, with hardware resources for the computer 60 achieves the information processing by the computer 60 having the above-mentioned hardware configurations. Specifically, the information processing method according to the present technology is achieved by loading a program configuring the software, which has been stored in the ROM 62 or the like, to the RAM 63 and executing it.

The program is installed to the computer 60 via a recording medium 61, for example. Alternatively, the program may be installed to the computer 60 via a global network or the like. In addition, any computer-readable non-transitory storage medium may be used.

Cooperation of a plurality of computers connected to be capable of communicating via the network or the like may execute the information processing method and the program according to the present technology or create the information processing apparatus according to the present technology.

That is, the information processing method and the program according to the present technology can be executed not only in a computer system configured by a single computer but also in a computer system in which a plurality of computers cooperatively operates.

It should be noted that in the present disclosure, the system means a set of a plurality of components (apparatuses, modules (parts), and the like) and it does not matter whether or not all the components are housed in the same casing. Therefore, both a plurality of apparatuses housed in separate casings and connected to one another via a network and a single apparatus having a plurality of modules housed in a single casing are the system.

Executing the information processing method and the program according to the present technology by the computer system includes both executing, by a single computer, the determination as to whether the user attempts to pinch and hold the object, the hold determination, the release determination, the notification control, and the reproduction control of the virtual content, for example, and executing these processes by different computers. Moreover, executing the respective processes by a predetermined computer includes causing another computer to execute some or all of those processes and acquiring the results.

That is, the information processing method and the program according to the present technology can also be applied to a cloud computing configuration in which a plurality of apparatuses shares and cooperatively processes a single function via a network.

The configurations such as the AR providing system, the HMD, the virtual object, and the wearable controller, the respective processing flows, and the like described above with reference to the drawings are merely embodiments, and can be modified as appropriate without departing from the gist of the present technology. That is, any other configurations, algorithms, and the like for carrying out the present technology may be employed.

In the present disclosure, for the sake of easy understanding, the wordings, "substantially", "almost", and "about" are used as appropriate. However, no clear difference is defined between a case with the wordings, "substantially", "almost", and "about" and a case without these wordings.

That is, in the present disclosure, it is assumed that the concepts that define the shape, the size, the position relationship, the state, and the like such as "center", "middle", "uniform", "equal", the "same", "orthogonal", "parallel", "symmetric", "extending", "axial", "columnar", "cylindrical", "ring-shaped", and "annular" are concepts including "substantially center", "substantially middle", "substantially uniform", "substantially equal", "substantially the same", "substantially orthogonal", "substantially parallel", "substantially symmetric", "substantially extending", "substantially axial", "substantially columnar", "substantially cylindrical", "substantially ring-shaped", "substantially annular", and the like.

For example, states included in a predetermined range (e.g., ±10% range) using "completely center", "completely middle", "completely uniform", "completely equal", "completely the same", "completely orthogonal", "completely parallel", "completely symmetric", "completely extending", "completely axial", "completely columnar", "completely cylindrical", "completely ring-shaped", "completely annular", and the like as the bases are also included.

Therefore, also a case where no wordings, "substantially", "almost", and "about" are added can include concepts that can be expressed by adding so-called "substantially", "almost", "about", and the like. On the contrary, states expressed with "substantially", "almost", "about", and the like does not necessarily exclude complete states.

In the present disclosure, the comparative expressions, e.g., "larger than A" or "smaller than A" are expressions encompassing both a concept including a case where it is equal to A and a concept not including a case where it is equal to A. For example, "larger than A" is not limited to the case where not including "equal to A", and also includes "A or more". Moreover, "smaller than A" is not limited to "less than A", and also includes "A or less".

For carrying out the present technology, specific settings and the like only need to be employed as appropriate on the basis of the concepts included in "larger than A" and "smaller than A" so as to provide the above-mentioned effects.

At least two of the features according to the present technology, which have been described above, may be combined. That is, the various features described in the respective embodiments may be combined across the respective embodiments as appropriate. Moreover, the above-mentioned various effects are merely exemplary and not limitative, and other effects may be provided.

It should be noted that the present technology can also take the following configurations.

(1) An information processing apparatus, including
a hold determination unit that determines, in a case where a rate of decrease of a distance between a first hold-side object and a second hold-side object that set a virtual object as a pinch-and-hold target becomes smaller than a predetermined threshold value, that the virtual object has been held by the first hold-side object and the second hold-side object.

(2) The information processing apparatus according to (1), further including
a storage unit that stores a distance between the first hold-side object and the second hold-side object when the hold determination unit determines that the virtual object has been held, as a hold determination distance; and
a cancel determination unit that determines whether or not the hold of the virtual object by the first hold-side object and the second hold-side object has been cancelled on the basis of the stored hold determination distance.

(3) The information processing apparatus according to (2), in which
the cancel determination unit determines that the hold has been cancelled in a case where the distance between the first hold-side object and the second hold-side object becomes larger than a distance obtained by adding a predetermined threshold value to the hold determination distance.

(4) The information processing apparatus according to any one of (1) to (3), in which
the first hold-side object is one or more predetermined fingers of a user, and
the second hold-side object is one or more other fingers different from the one or more predetermined fingers of the user.

(5) The information processing apparatus according to any one of (1) to (4), in which
the hold determination unit sets two objects which attempt to pinch and hold the virtual object as the first hold-side object and the second hold-side object.

(6) The information processing apparatus according to any one of (1) to (5), in which
the hold determination unit sets, in a case where a user has directed a finger pad of each of two fingers towards the virtual object, the two fingers as the first hold-side object and the second hold-side object, respectively.

(7) The information processing apparatus according to any one of (1) to (6), in which
the hold determination unit sets, in a case where a user has directed portions of two adjacent fingers, which face each other, towards the virtual object, the two fingers as the first hold-side object and the second hold-side object, respectively.

(8) The information processing apparatus according to any one of (1) to (7), in which
the hold determination unit sets two objects whose distance to the virtual object is smaller than the predetermined threshold value as the first hold-side object and the second hold-side object, respectively.

(9) The information processing apparatus according to any one of (1) to (8), in which
the hold determination unit sets two objects determined to have collided with the virtual object as the first hold-side object and the second hold-side object, respectively.

(10) The information processing apparatus according to any one of (1) to (9), in which
the hold determination unit sets the first hold-side object and the second hold-side object on the basis of at least one of a shape or a size of the virtual object.

(11) The information processing apparatus according to any one of (1) to (10), in which
the hold determination unit sets a thumb finger of a user and one or more other fingers of the same hand as the thumb finger as the first hold-side object and the second hold-side object.

(12) The information processing apparatus according to (11), in which
the hold determination unit executes, in a case where a plurality of fingers is set as the first hold-side object or the second hold-side object, hold determination of the virtual object by using a position of a center of weight of the plurality of fingers as a reference.

(13) The information processing apparatus according to any one of (1) to (12), further including
a notification control unit that notifies a user of at least one of the fact that the virtual object has been held by the first hold-side object and the second hold-side object or the fact that the hold of the virtual object by the first hold-side object and the second hold-side object has been cancelled.

(14) The information processing apparatus according to (13), in which
the notification control unit executes notification by at least one of presentation of a sense of touch, display of a virtual image, or output of a sound.

(15) The information processing apparatus according to (14), in which
the notification control unit displays, in a case where the first hold-side object or the second hold-side object which holds the virtual object is spaced apart from the virtual object when the hold determination unit determines that the virtual object has been held, a virtual image of the hold-side object spaced apart from the virtual object in such a manner that the virtual image is in contact with the virtual object.

(16) The information processing apparatus according to any one of (1) to (15), further including
a storage unit that stores a distance between the first hold-side object and the second hold-side object when the hold determination unit determines that the virtual object has been held, as a hold determination distance, in which
the hold determination unit determines, in a case where the distance between the first hold-side object and the second hold-side object becomes equal to the hold determination distance stored at the time when the same virtual object is pinched and held in the past, that the virtual object has been held by the first hold-side object and the second hold-side object.

(1) The information processing apparatus according to any one of (1) to (16), further including
a storage unit that stores, with respect to each of a plurality of users, a distance between the first hold-side object and the second hold-side object when the hold determination unit determines that the virtual object has been held, as a hold determination distance, in which
the hold determination unit determines, in a case where the distance between the first hold-side object and the second hold-side object becomes equal to the hold determination distance stored at the time when another user pinches and holds the same virtual object, that the virtual object has been held by the first hold-side object and the second hold-side object.

(1) The information processing apparatus according to any one of (1) to (17), further including
a storage unit that stores a distance between the first hold-side object and the second hold-side object when an actual object corresponding to the virtual object has been pinched and held by the first hold-side object and the second hold-side object as an actual hold distance, in which
the hold determination unit determines, in a case where the distance between the first hold-side object and the second hold-side object becomes equal to the actual hold distance, that the virtual object has been held by the first hold-side object and the second hold-side object.

(19) An information processing method to be executed by a computer system, including
determining, in a case where a rate of decrease of a distance between a first hold-side object and a second hold-side object that set a virtual object as a pinch-and-hold target becomes smaller than a predetermined threshold value, that the virtual object has been held by the first hold-side object and the second hold-side object.

(20) A program that causes a computer system to execute
a step of determining, in a case where a rate of decrease of a distance between a first hold-side object and a second hold-side object that set a virtual object as a pinch-and-hold target becomes smaller than a predetermined threshold value, that the virtual object has been held by the first hold-side object and the second hold-side object.

REFERENCE SIGNS LIST

D finger-to-finger distance
D1 hold determination distance
D2 release determination distance
D3 distance to virtual object
S1 finger pad
1 AR providing system
2 HMD
3 user
4 actual object
5 virtual object
20 storage unit
21 controller
26 information acquisition unit
27 object recognition unit
28 hold determination unit
29 release determination unit 31 AR reproduction control unit
32 sending control unit
34 first hold-side object
35 second hold-side object
37 thumb finger
38 index finger
39 middle finger
40 ring finger
44 wearable controller
60 computer

The invention claimed is:

1. An information processing apparatus comprising processing circuitry configured to:

determine, in a case where a rate of decrease of a distance between a first hold-side object and a second hold-side object that set a virtual object as a pinch-and-hold target becomes smaller than a predetermined threshold value, that the virtual object has been held by the first hold-side object and the second hold-side object, wherein the first hold-side object and the second hold-side object are not in contact.

2. The information processing apparatus according to claim 1, wherein the virtual object is an object with a predetermined width.

3. The information processing apparatus according to claim 2, wherein a distance between the first hold-side object and the second hold-side object is greater than the width of the virtual object.

4. The information processing apparatus according to claim 2, wherein a distance between the first hold-side object and the second hold-side object is same with the width of the virtual object.

5. The information processing apparatus according to claim 1, further comprising a non-transitory computer-readable storage configured to store a distance between the first hold-side object and the second hold-side object when the processing circuitry determines that the virtual object has been held, as a hold determination distance, wherein the processing circuitry is further configured to determine whether or not the hold of the virtual object by the first hold-side object and the second hold-side object has been cancelled on a basis of the stored hold determination distance.

6. The information processing apparatus according to claim 5, wherein the processing circuitry is further configured to determine that the hold has been cancelled in a case where the distance between the first hold-side object and the second hold-side object becomes larger than a distance obtained by adding a predetermined threshold value to the hold determination distance.

7. The information processing apparatus according to claim 1, wherein the first hold-side object is one or more predetermined fingers of a user, and the second hold-side object is one or more other fingers different from the one or more predetermined fingers of the user.

8. The information processing apparatus according to claim 1, wherein the processing circuitry is further configured to set two objects which attempt to pinch and hold the virtual object as the first hold-side object and the second hold-side object.

9. The information processing apparatus according to claim 1, wherein the processing circuitry is further configured to set, in a case where a user has directed a finger pad of each of two fingers towards the virtual object, the two fingers as the first hold-side object and the second hold-side object, respectively.

10. The information processing apparatus according to claim 1, wherein the processing circuitry is further configured to set, in a case where a user has directed portions of two adjacent fingers, which face each other, towards the virtual object, the two fingers as the first hold-side object and the second hold-side object, respectively.

11. The information processing apparatus according to claim 1, wherein the processing circuitry is further configured to set two objects whose distance to the virtual object is smaller than the predetermined threshold value as the first hold-side object and the second hold-side object, respectively.

12. The information processing apparatus according to claim 1, wherein the processing circuitry is further configured to set two objects determined to have collided with the virtual object as the first hold-side object and the second hold-side object, respectively.

13. The information processing apparatus according to claim 1, wherein the processing circuitry is further configured to set the first hold-side object and the second hold-side object on a basis of at least one of a shape or a size of the virtual object.

14. The information processing apparatus according to claim 1, wherein the processing circuitry is further configured to set a thumb finger of a user and one or more other fingers of a same hand as the thumb finger as the first hold-side object and the second hold-side object.

15. The information processing apparatus according to claim 14, wherein the processing circuitry is further configured to execute, in a case where a plurality of fingers is set as the first hold-side object or the second hold-side object, hold determination of the virtual object by using a position of a center of weight of the plurality of fingers as a reference.

16. The information processing apparatus according to claim 1, wherein the processing circuitry is further configured to notify a user of at least one of that the virtual object has been held by the first hold-side object and the second hold-side object or that the hold of the virtual object by the first hold-side object and the second hold-side object has been cancelled.

17. The information processing apparatus according to claim 16, wherein the processing circuitry is further configured to execute notification by at least one of presentation of a sense of touch, display of a virtual image, or output of a sound.

18. The information processing apparatus according to claim 17, wherein the processing circuitry is further configured to initiate display, in a case where the first hold-side object or the second hold-side object which holds the virtual object is spaced apart from the virtual object when the processing circuitry determines that the virtual object has been held, of a virtual image of the hold-side object spaced apart from the virtual object in such a manner that the virtual image is in contact with the virtual object.

19. An information processing method to be executed by a computer system, comprising:

determining, in a case where a rate of decrease of a distance between a first hold-side object and a second hold-side object that set a virtual object as a pinch-and-hold target becomes smaller than a predetermined threshold value, that the virtual object has been held by the first hold-side object and the second hold-side object, wherein the first hold-side object and the second hold-side object are not in contact.

20. A non-transitory computer-readable medium having embodied thereon a program, which when executed by at least one processor of a computer system causes the computer system to execute a method, the method comprising:

determining, in a case where a rate of decrease of a distance between a first hold-side object and a second hold-side object that set a virtual object as a pinch-and-hold target becomes smaller than a predetermined threshold value, that the virtual object has been held by the first hold-side object and the second hold-side object, wherein the first hold-side object and the second hold-side object are not in contact.

* * * * *